(12) United States Patent
Boone et al.

(10) Patent No.: US 7,274,908 B1
(45) Date of Patent: Sep. 25, 2007

(54) METHOD, APPARATUS, AND SYSTEM FOR DEMAND ASSIGNMENT IN A COMMUNICATION NETWORK

(75) Inventors: Joseph J. Boone, Fairfax, VA (US); Hao Cheng, Herndon, VA (US); David B. S. Edsberg, Herndon, VA (US); Venugopal Eyyunni, Centreville, VA (US); Jason B. Maiorana, Vienna, VA (US)

(73) Assignee: IDirect Incorporated, Reston, VA (US)

( * ) Notice: Subject to any disclaimer, the term of this patent is extended or adjusted under 35 U.S.C. 154(b) by 800 days.

(21) Appl. No.: 10/721,414

(22) Filed: Nov. 26, 2003

(51) Int. Cl.
*H04B 7/19* (2006.01)
*H04J 3/06* (2006.01)

(52) U.S. Cl. .................. 455/13.2; 455/502; 455/430; 455/420; 370/509

(58) Field of Classification Search ............... 455/502, 455/13.2, 420, 427, 429, 430, 12.1, 13.1, 455/503, 515, 69, 522; 370/509, 321, 324, 370/510, 503, 331, 350, 354, 512
See application file for complete search history.

(56) References Cited

U.S. PATENT DOCUMENTS

| | | | |
|---|---|---|---|
| 4,688,216 A * | 8/1987 | Saburi | 370/216 |
| 4,722,083 A | 1/1988 | Tirro et al. | |
| 4,763,325 A | 8/1988 | Wolfe et al. | |
| 4,858,225 A | 8/1989 | deSantis | |
| 5,051,989 A | 9/1991 | Negishi | |
| 5,768,266 A | 6/1998 | Thompson et al. | |
| 5,790,939 A | 8/1998 | Malcolm et al. | |
| 5,910,945 A * | 6/1999 | Garrison et al. | 370/324 |
| 6,097,706 A | 8/2000 | Fielding et al. | |
| 6,104,708 A | 8/2000 | Bergamo | |
| 6,122,293 A | 9/2000 | Frodigh et al. | |
| 6,198,734 B1 | 3/2001 | Edwards et al. | |
| 6,212,240 B1 | 4/2001 | Scheibel, Jr. et al. | |
| 6,301,310 B1 | 10/2001 | Jackson et al. | |
| 6,351,499 B1 | 2/2002 | Paulraj et al. | |
| 6,353,645 B1 * | 3/2002 | Solve et al. | 455/502 |
| 6,377,561 B1 | 4/2002 | Black et al. | |
| 6,381,227 B1 | 4/2002 | Fielding et al. | |

(Continued)

OTHER PUBLICATIONS

Sasmith Reddi, "Voice over IP (VoIP) over Satellite," emailed Aug. 7, 2002, 2 pages.

(Continued)

*Primary Examiner*—Edward F. Urban
*Assistant Examiner*—John J. Lee
(74) *Attorney, Agent, or Firm*—Oblon, Spivak, McClelland, Maier & Neustadt, P.C.

(57) ABSTRACT

A demand assignment method for a communication network including a hub and a plurality of user nodes includes adding a demand field to each data burst from a user node. Further, the method includes transmitting a first and second frame with first and second burst time plans from the hub to each user node, and transmitting a first and second respective data burst and demand field from each of the user nodes to the hub according to the first and second control information. The first data burst from each user node arrives simultaneously at the hub, and the second data burst from each user node arrives simultaneously at the hub. Further, the second data burst from each user node arrives immediately following the arrival of the first data burst from each user node.

12 Claims, 23 Drawing Sheets

U.S. PATENT DOCUMENTS 6,434,361 B1    8/2002   Carrozza et al.
6,539,003 B1    3/2003   Agarwal et al.
6,549,530 B1    4/2003   Cable et al.
6,625,130 B2    9/2003   Fielding
6,665,829 B2   12/2003   Eroz et al.
7,042,854 B2 *  5/2006   Beidas et al. ............... 370/324

OTHER PUBLICATIONS

Sasmith Reddi, "DVB (Digital Video Broadcast) vs. iDirect Technology," emailed Jul. 16, 2002, 6 pages.

* cited by examiner

| NODE | SLOTS ALLOCATED | TOTAL_SLOTS/ SLOTS_ALLOCATED | TARGET SLOT ASSIGNMENTS | ACTUAL SLOT ASSIGNMENTS |
|---|---|---|---|---|
| 3 | 11 | 5.45 | 0 6 11 17 22 28 33 39 44 50 55 | 0 6 11 17 22 28 33 39 44 50 55 |
| 2 | 8 | 7.5 | 0 8 15 23 30 38 45 53 | 1 9 16 24 31 38 46 54 |
| 4 | 6 | 10 | 0 10 20 30 40 50 | 2 12 21 32 42 52 |
| 1 | 4 | 15 | 0 15 30 45 | 3 18 34 48 |
| 5 | 2 | 30 | 0 30 | 4 35 |

METHOD, APPARATUS, AND SYSTEM FOR DEMAND ASSIGNMENT IN A COMMUNICATION NETWORK

CROSS REFERENCE TO RELATED APPLICATIONS

The present application contains subject matter related to that disclosed in commonly owned U.S. patent application Ser. No. 10/721,496, entitled METHOD, APPARATUS, AND SYSTEM FOR DOWNSTREAM RECOVERY IN A COMMUNICATION NETWORK, filed Nov. 26, 2003; U.S. patent application Ser. No. 10/721,497, entitled METHOD, APPARATUS, AND SYSTEM FOR USING A SYNCHRONOUS BURST TIME PLAN IN A COMMUNICATION NETWORK, filed Nov. 26, 2003; U.S. patent application Ser. No. 10/721,410, entitled METHOD, APPARATUS, AND SYSTEM FOR FEATHERING DATA IN A COMMUNICATION NETWORK, filed Nov. 26, 2003; and U.S. patent application Ser. No. 10/721,419, entitled METHOD, APPARATUS, AND SYSTEM FOR CALCULATING AND MAKING A SYNCHRONOUS BURST TIME PLAN IN A COMMUNICATION NETWORK, filed Nov. 26, 2003, each of which is incorporated by reference herein in its entirety.

BACKGROUND OF THE INVENTION

1. Field of the Invention

This invention relates in general to satellite communication networks and in particular to a method, apparatus and system for efficiently optimizing bandwidth and sharing resources between multiple users of a satellite communication network.

2. Discussion of the Background

Geo-synchronous satellite communication networks have existed for decades in various topologies and using various methods for sharing a fixed bandwidth channel between multiple users (Pritchard, Wilbur L., and Joseph A. Scivlli, *Satellite Communication Systems Engineering*, Prentice-Hall, 1986, incorporated in its entirely herein by reference). As these networks evolved, Time Division Multiple Access (TDMA) and Frequency Division Multiple Access (FDMA) bandwidth sharing techniques, and bandwidth efficient Quadrature Phase Shift Keying (QPSK) modulation have become de facto standards for Layer 1 (physical layer) although many other techniques and modulations are used to some extent.

Pure TDMA mesh networks exist, in which all user nodes take turns transmitting in a half duplex fashion. Pure FDMA point-to-point, or Single Channel Per Carrier (SCPC) networks, exist to allow full duplex transmission and reception. Many commercially viable network systems have evolved into a hybrid star topology, as shown in FIG. 1, taking advantage of the broadcast nature of geo-synchronous satellites by using a SCPC downstream carrier from a central hub to all user nodes, and using one or more TDMA upstream(s) shared by all user nodes to communicate with the hub.

FIG. 1 illustrates a conventional satellite communication network. A plurality of user nodes 12 communicate with a hub 11 via a satellite 10. The hub 11 transmits data to the user nodes 12 via broadcast downstream channels 13. Each of the user nodes 12 transmit data to the hub 11 via upstream channel 14.

A very popular and simple implementation of the TDMA upstream channel is to use an ALOHA technique enabling any user node to transmit to the hub any time the user node has data to send and relying on the probability that no other user node chose to transmit at that time, which would cause a collision. Once the demand for bandwidth exceeds 18.4% of the upstream channel (or 36.8% for slotted ALOHA), a more complex Layer 2 (media access control layer) methodology is required to schedule TDMA bursts so that collisions are prevented.

Many such Layer 2 methods exist, ranging from static configurations that permanently assign a given time slot to each user node, to more dynamic configurations which schedule bursts to service specific needs of individual user nodes.

As with any network system, the usefulness of control techniques at Layer 2 or higher is dependent on reliable performance of Layer 1. The geo-stationary satellite channel is well known to have an extremely long one-way delay (up to ~300 ms) and it is extremely power limited due to the long propagation delay which results in the need to operate at the lowest signal-to-noise-ratio (SNR) possible in order to minimize the cost of radio-frequency (RF) equipment. Additionally, the channel is subject to further attenuation due to atmospheric conditions, some of which are variable, such as rain fade. If the SNR becomes too low, the bit error rate increases to an unacceptable level and all communication breaks down and creates adverse effects up the entire protocol stack. In particular, the Layer 2 slot allocation process breaks down very quickly for reliable protocol-protected data since the bandwidth demanded by user nodes is allocated by the system, but the user nodes' demand level is not reduced since data is lost and must be retransmitted. The situation worsens when the SNR is reduced so badly due to a fade condition that even station-keeping control information cannot get through and the user node actually drops out of the network. In this case the slot allocation process may waste valuable bandwidth before learning of the outage by allocating slots to the user node that the user node is unable to use.

Problems continue to arise as modern higher-level protocols are considered such as Voice over IP (VoIP) and streaming media which are sensitive to packet jitter. These protocols are designed to overcome the jitter of Internet Protocol (IP) traveling over terrestrial connections where the jitter is primarily due to queuing delays; however, the jitter introduced by a shared TDMA upstream satellite channel is often enough to degrade performance even when quality of the Layer 1 connection is excellent.

Any Layer 2 control protocol designed to maximize throughput and mitigate the performance problems experienced by users of satellite networks is itself subject to the same problems as the application data packets. Traditional control methods requiring handshaking are not very helpful since it takes too long, for example, to command one user node to stop transmitting on a TDMA slot, wait for an acknowledgement, and then command another user node to begin. Adding multiple upstream channels such that user nodes may transmit on any one of several channels helps matters somewhat since it increases the possible number of transmission opportunities per frame, however it does not solve the problem of the delay incurred while changes are made to the slot allocation.

An additional Layer 1 problem in traditional satellite networks, as recognized by the present inventors, is that the network's link budgets are over-designed due to the lack of adaptability of the modulation, demodulation, and FEC processes used therein. For example, if the threshold SNR of a link to achieve the minimum BER is 5 dB, a conventional link budget will include the amount of power required to achieve a 5 dB SNR plus XdB of rain margin (see Pritchard). The conventional approach is based upon the assumption that when it rains, there will be up to XdB of atmospheric attenuation so an SNR of (5+X)dB is established during clear sky conditions to ensure an SNR of at least 5 dB during heavy rain. During clear sky conditions, which occur most of the time for much of the world, XdB of link margin are wasted in the conventional approach.

FIG. 2 illustrates additional problems with conventional network communication methods, as recognized by the present inventors. This figure represents two timing scenarios, labeled as follows: No Synchronization, and Conventional Synchronization. In each scenario, HRxSOFn(ta) represents the nominal time a start of a data burst time frame (i.e. Start of Frame (SOF)) is received from user node "n," and $k_{max}*2$ represents the maximum variation of reception time, or tracking error, for the worst case user node, due to minor perturbations in satellite position. The frame's relative frame sequence is "a."

In the No Synchronization scenario, SOFs are unconstrained and arrive at various times due to variations between the propagation delays of each user node. In the Conventional Synchronization scenario, a time $R_{cdn}$ (Remote Conventional Delay for User Node n) is added at each user node so that SOFs from all user nodes are received synchronously to the Hub's transmit reference SOF.

The conventional approach synchronizes HRxSOFn of each user node, but arrival time variation resulting from satellite tracking error disadvantageously results in some HRxSOFn occurring during hub frame n and some HRxSOFn occurring during hub frame n−1.

Further, in the conventional approach, $R_{cdn}$ is chosen to synchronize HRxSOFn with subsequent Hub transmit SOF, which results in simultaneous arrival of SOFs sent at different times in the frame sequence. Thus, data bursts arriving at the Hub cannot be assumed to have all been sent during the same frame time, thereby complicating network control methods and increasing response time to control commands sent from the Hub.

As recognized by the present inventors, the industry is in need of a network system that combats these problems and enables standard off-the-shelf networking equipment using standard protocols to take advantage of a communication satellite's ability to reach user nodes at extreme distances and in areas of the world where broadband terrestrial communication is otherwise not practical.

SUMMARY OF THE INVENTION

Accordingly, one object of this invention is to address the above-identified and other problems with conventional systems and methods.

The present invention provides a method to enable a satellite network system to dynamically monitor and adapt in real time to changing conditions on each satellite channel and changing traffic patterns at the user nodes. Another object of this invention is to maximize the quality of service that all users of the network experience by ensuring that each user node is communicating with the hub station at a higher data rate than conventionally possible while staying above a threshold bit error rate, and furthermore, to ensure that the TDMA upstream channel is shared amongst all users and applications according to predefined rules.

At least three processes and their associated signaling protocols are used to accomplish this goal. The Demand Assignment (DA) process makes a decision every frame (40 ms+processing or greater) about how many TDMA time slots out of an available pool of time slots will be allocated to each user node to transmit data to the hub station. An Uplink Control (UC) process constantly (or at least nearly constantly) monitors channel assessments made by the hub receiver every time a packet is received, sorts the assessments by user node, and makes a decision as to whether a user node should modify its frequency offset, symbol timing offset, transmit power, modulation, or FEC code in order to maintain channel quality as good or better than a threshold bit error rate (BER). Finally, a Downstream Recovery (DR) process monitors the remote status messages received periodically from each user node and determines from the downstream SNR and number of cyclical redundancy check (CRC) errors reported whether the node has fallen below the threshold BER. In this case, or the case that communication is lost completely with a user node, the DR process begins to send recovery packets to the node using an alternate, more robust, modulation (e.g., Bi-Phase Shift Keying (BPSK) modulation) using more energy per bit and/or a more powerful FEC code to try and reestablish communication.

To enable the DA and UC processes to work reliably and react quickly to changing channel conditions, a synchronous Burst Time Plan (sBTP) is employed. The sBTP ensures that the propagation delay is a same integer number of frames for all node-to-hub paths. This enables time slots, modulation, and FEC to be changed every frame even though that frame is much shorter than the propagation delay between the hub and the user nodes.

Since rain fade is a physical property of the satellite channel, it is not possible to directly counteract its effect without making a tradeoff. The traditional tradeoffs include either over-designing the link (which requires using more expensive RF equipment and possibly wasting bandwidth by power limiting the link), or allowing the BER to increase (which could become so bad that it causes a complete outage). The UC and DR processes take a different approach, which is to lower the effective data rate of the link by changing modulation or FEC during the rain fade without BER degradation. Using traditional methods, the link is designed for some availability based on the percentage of time during the year that there is heavy rain at the user node location. For example, if it is expected that there will be rain fade of greater than 3 dB 0.01% of the year, the link can be over-designed by 3 dB to produce a link that is 99.99% available. If the same link were designed using a UC and DR process, the link could be designed with no rain margin. When a rain fade occurs, UC and DR sense the condition and change to an alternate modulation and FEC code which requires 3 dB less SNR in order to maintain the desired BER. The consequence of using the alternate modulation and FEC is that the data rate of the link is reduced (e.g., switching from QPSK to BPSK halves the number of bits per second, and increasing the FEC rate could reduce the data rate further). However, as recognized by the present inventors it is preferable to avoid the cost of over-designing the link in exchange for operating at a lower data rate during the infrequent periods of heavy rain. In fact, the UC and DR capability results in users getting higher performance than they would using a traditional link design by choosing not to decrease the cost of RF equipment, but instead to use the rain margin that is no longer required to increase the bit rate that they can operate under clear sky conditions. Either way, UC and DR allow the users a valuable choice that they would not otherwise have.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 3:
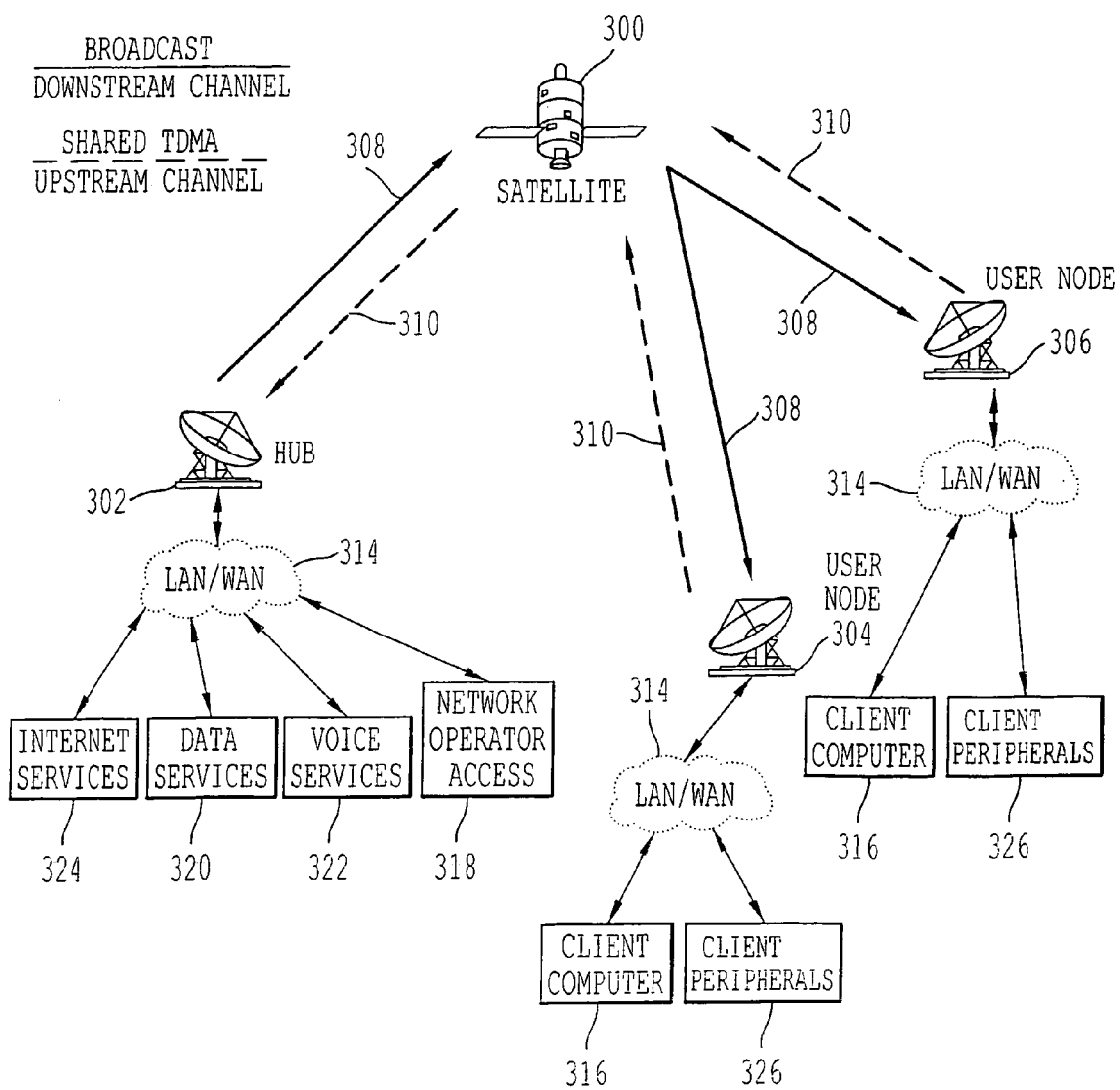
FIG. 3 illustrates a communication network system according to the present invention.
Figure 4:
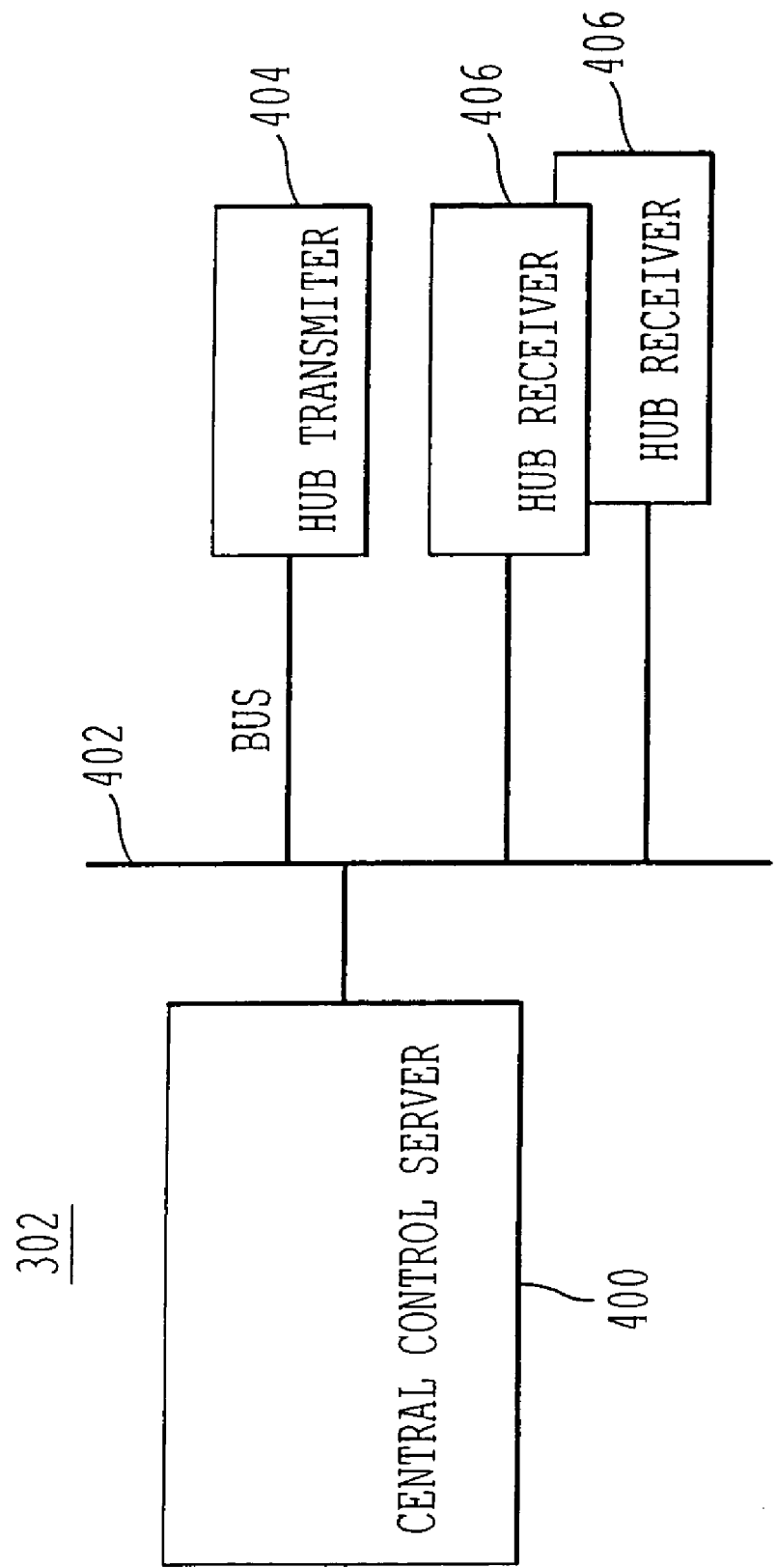
FIG. 4 is a block diagram of a hub according to an embodiment of the invention.
Figure 21:
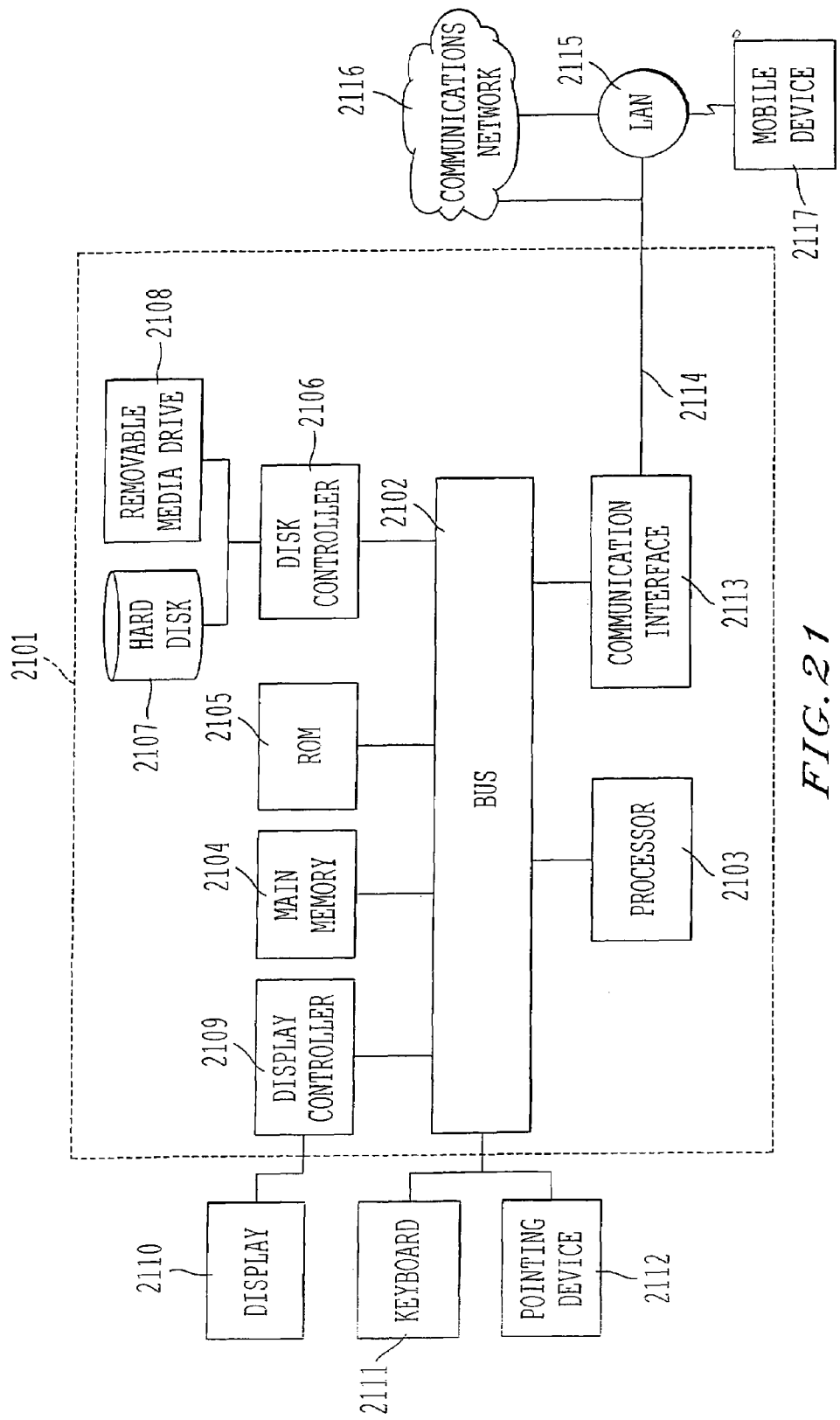
FIG. 21 is a block diagram of an exemplary processor apparatus according to the present invention.

Referring now to the drawings, wherein like reference numerals designate identical or corresponding parts throughout the several views, and more particularly to FIG. 3 thereof, which illustrates an embodiment of a satellite communication network according to the invention. A plurality of user nodes 304 communicate with a hub 302 via a satellite 300. The hub 302 transmits a sequence of frames to the user nodes 304 via broadcast downstream channel(s) 308. Each of the user nodes 304 transmit bursts of data to the hub 302 via shared TDMA upstream channel(s) 310. The hub 302 is further connected (via a wired or wireless connection) to a LAN/WAN 314 and thereby communicates with a plurality of devices including: network operator access devices 318 used to control system parameters; data service devices 320 including web servers, email servers, web/DNS caching servers, video archive servers, and other related devices; voice service devices 322 including VoIP gateways and other devices connected to the public switched telephone network; and internet service devices 324 including routers and other connection points to the global internet. Each of the user nodes 304 is further connected to a LAN/WAN 314, and thereby communicates with a plurality of client computers 316 and client peripherals 326, including video conferencing devices, web servers, LAN routers with connections to other networks, VoIP routers with connections to telephone and fax devices, and other peripherals. An embodiment of the hub 302, illustrated in FIG. 4, includes a central control server 400 (a more detailed example of which is shown in FIG. 21), connected via a bus 402, to a hub transmitter 404 and a plurality of hub receivers 406.

For example, an embodiment of the present invention may be used by a business with remotely located organizations or users that otherwise have no conventional means of accessing the global internet or an intranet. Client computers 316 connected to a user node 304 could include a single PC or an entire LAN/WAN with many PCs, VoIP equipment, videoconferencing equipment, web servers, or any other piece of equipment that can communicate directly or indirectly using IP packets over Ethernet. Network operators may, for example, use the present invention to provide satellite connectivity to these users. The network operator is responsible for administering at least the satellite portion of the network. The operator has special access to the central control server 400, which configures, monitors, and controls the network. Network control tasks may include adding and removing user nodes 304, and changing data rate and QoS parameters, etc. . . An example of a hub installation according to the present invention includes a router connected to the central control server 400 and, via the LAN/WAN 314 and internet service devices 324, connected to the global internet. This example configuration allows client computers 316 to access the internet over the satellite link by designating the IP default gateway of each of the client computers 316 as the user node's IP address. This causes any packets generated at the user node's LAN/WAN 314 destined for IP addresses that are not local to be forwarded to the satellite router and over the air to the hub 302. Similarly, the default gateway of the central control server 400 is set for the router connected to the global internet. This causes packets that arrive at the hub 302 with IP addresses not matching any of the subnets on the satellite network to be forwarded to the router and then on to the global internet.

In addition to a global internet connection, the network operator may have value added services running at the hub's LAN/WAN. An example embodiment of the present invention includes a VoIP gateway voice services device 322 which is connected to the LAN/WAN 314 at the hub and also to a Public Switched Telephone Network (PSTN). In this example, the user nodes 304 use VoIP equipment to call phone numbers on the PSTN using the satellite network as a transport. Also in this example, web and email server and caching equipment internet service devices 324 connected to the hub 302 offer special services to the clients connected to user nodes 304.

In addition, although only a communication network including a geostationary satellite has been discussed, the present invention also applies to communication networks without a geostationary satellite, but instead incorporating other physical layer features. For example, the network may include optical transceivers, wireless or WiFi network devices, microwave transceivers, broad beam or other low gain antenna based devices, low-earth, medium-earth, or elliptical orbiting satellites, and other physical layer links as hubs and/or user nodes, when a delay is involved, either due to propagation, or perhaps due to latency (e.g., a WiFi based hub that "wakes-up" at predetermined intervals to transmit data from/to user nodes, which may be other WiFi devices). Furthermore, terrestrial-based RF-microwave transceivers may be used as well.

Synchronous BTP

To synchronize user nodes with a hub according to one embodiment of the invention, a round trip delay between each hub/user node pair is set equal to a common integer number of frame lengths. A duration of the selected frame length influences system performance, as described below. In addition, all user nodes receive the Burst Time Plan (BTP) and apply it in a manner so that no two user nodes collide with one another when data arrives at the satellite (or hub receiver). These two requirements are satisfied by generating a system timing reference at the hub transmitter (hub TxSOF) and applying offsets at the hub receivers ($H_{fsd}$) and user nodes ($R_{fsd}$) to this reference. Each user node has its own $R_{fsd}$ based on its geographic location. In order to provide the maximum amount of time for the user nodes to process a BTP, these offsets are applied optimally.

Frame and Symbol Synchronization

The hub and all user nodes are referenced to a Transmit Start of Frame Sync Marker (TxSOF). This frame sync is generated by the hub transmitter periodically at a fixed rate. The time of arrival at each node of the frame sync is calculated based on the line of slight distance traveled by each signal between the hub, satellite and user nodes, and the known speed of radio signals along this path. The arrival time of each burst at satellite, and in turn at the hub receiver, is controlled by setting an appropriate fixed delay at each user node ($R_{fsd}$), as described below, thereby achieving synchronization of each user node to within a symbol period. Frame synchronization in turn allows for BTP synchronization. Note that throughout this specification, the use of terminology such as "SOF transmitted by user node" or "user node SOF received at the hub" refer to the starting point of a virtual frame time period, that includes actual data bursts within that frame sent from one or more user nodes to the hub; although, the user nodes do not send an actual SOF signal. SOFs from the user nodes should be thought of as the start of a virtual frame time period.

Figure 5:
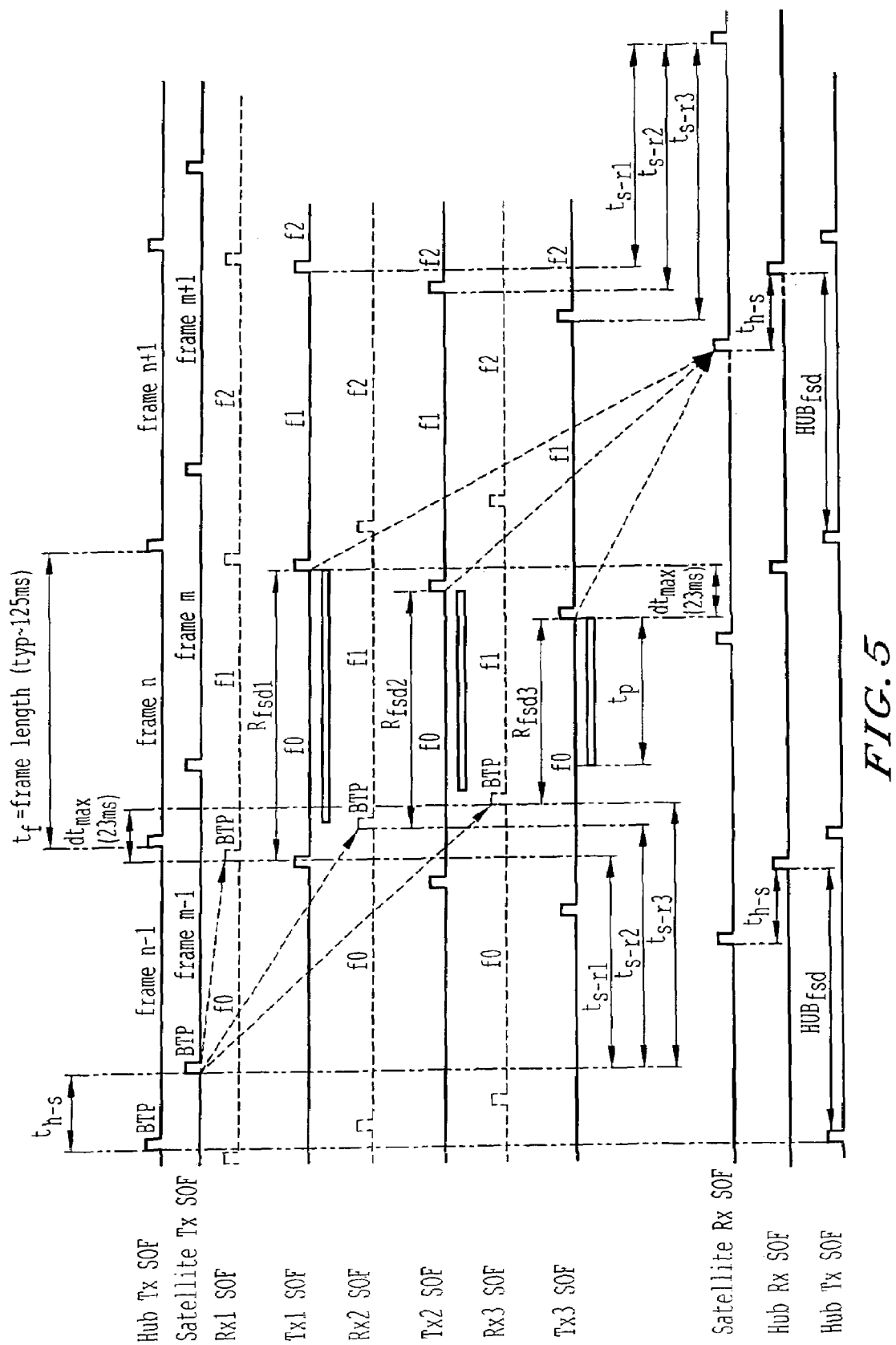
FIG. 5 is a timing diagram of a communication network system according to the present invention.

FIG. 5 depicts the timeline for an exemplary embodiment of synchronized BTP in an example network consisting of a hub and three user nodes. One user node, user node # 1, is located closest to the satellite, user node # 3 is located furthest from the satellite, and user node # 2 lies in between (in distance/time) of user nodes # 1 and # 3. In this example, a BTP is first transmitted from the hub to the satellite with a delay indicated as they. The BTP is then transmitted from the satellite to each of the three user nodes. The propagation delay of the BTP from the satellite to the user nodes is depicted by the three dotted lines extending from satellite TxSOF to Rx1 SOF, Rx2 SOF, and Rx3 SOF, and the propagation delays of the signals are $t_{s\text{-}r1}$, $t_{s\text{-}r2}$, and $t_{s\text{-}r3}$, respectively. A unique delay, $R_{fsd}$ n, is applied at each node before a start of frame time is transmitted to the satellite. From FIG. 5, it can be seen that the shortest $R_{fsd}$ is applied at user node 3, which is the greatest distance from the satellite, and the longest $R_{fsd}$ is applied at user node 1 which is the user node that is closest to the satellite. After applying the respective delay $R_{fsd}$ at each user node, each user node transmits data bursts in a frame time period to the satellite with start of frame time as depicted by the dotted lines going from Tx1 SOF, Tx2 SOF, and Tx3 SOF to the satellite Rx SOF. Further, as can be seen in FIG. 5, each $R_{fsd}$ value for a particular user node is selected such that all start of frame times transmitted by the user nodes arrive at the satellite simultaneously. Subsequently, the satellite transmits the received data bursts from the user node to the hub with a propagation delay of $t_{h\text{-}s}$. As shown in FIG. 5, the arrival time of the start of frame time periods from each user node is offset from a previous start of time frame to be sent from the hub by $HUB_{fsd}$.

Figure 6:
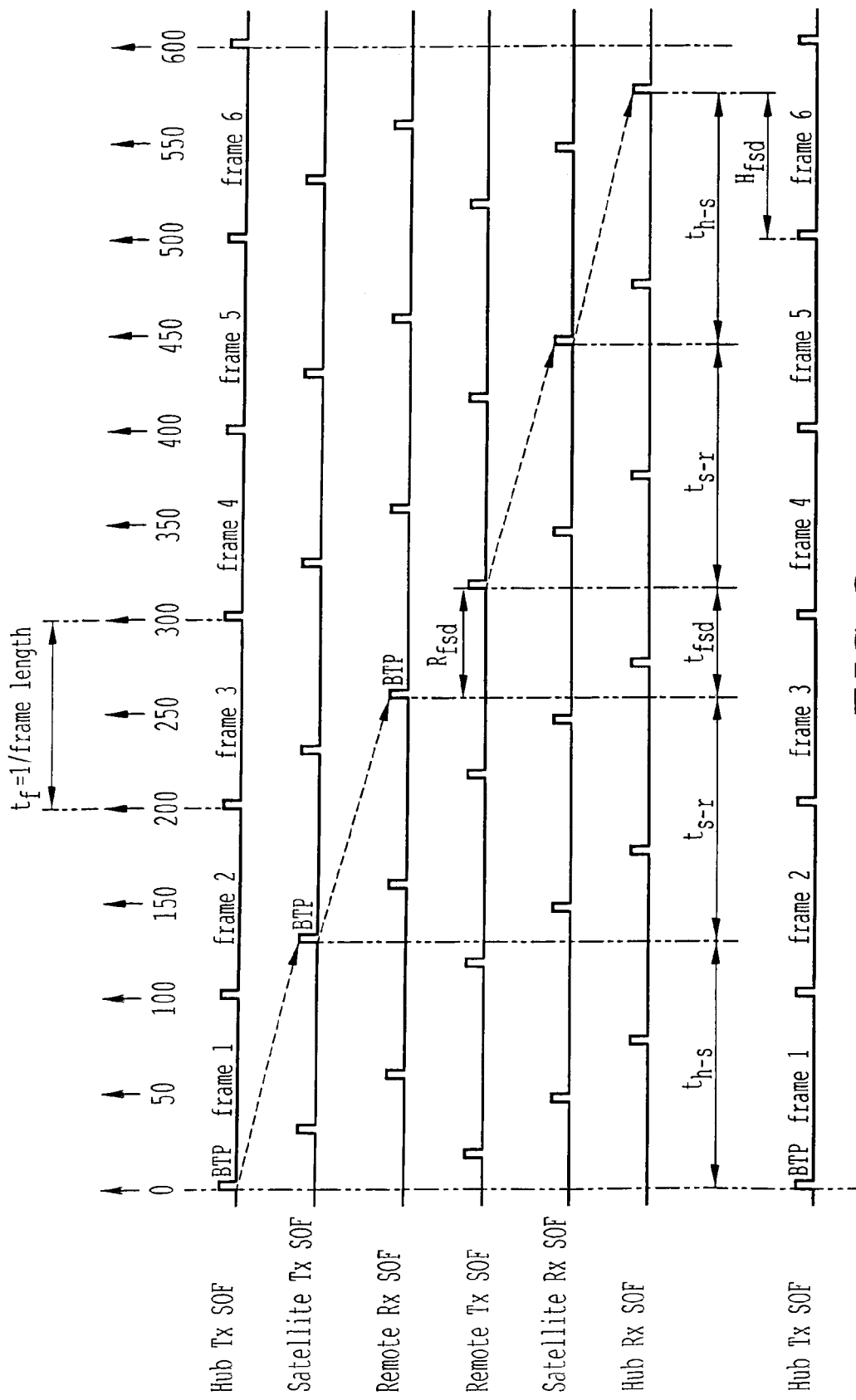
FIG. 6 is an example of $R_{fsd}$ and $H_{fsd}$ timing diagram according to the present invention.

FIG. 6 illustrated the round trip delay in the signal path from a hub Tx SOF to a hub Rx SOF, including delay $R_{fsd}$ for a particular user node. In this example, the propagation delay from hub Tx SOF to satellite Tx SOF is indicated as $t_{h\text{-}s}$, the propagation delay from satellite Tx SOF to remote Rx SOF is indicated as $t_{s\text{-}r}$, the delay time applied at the user node $t_{fsd}$ is applied between the time of remote Rx SOF and remote Tx SOF at the user node. The propagation delay time from remote Tx SOF until satellite Rx SOF is illustrated as $t_{s\text{-}r}$, and the propagation delay from satellite Rx SOF until hub Rx SOF is indicated as $t_{h\text{-}s}$. Further, hub Rx SOF is received $H_{fsd}$ after the previous hub Tx SOF in frame 6.

Calculation of the $R_{fsd}$ for each user node depends upon a Hub Frame Start Delay, $H_{fsd}$. The $H_{fsd}$ is based on:
- location of a virtual user node (vr) at a location on the earth which is closest to the satellite, a known constant, which determines a signal propagation delay between the satellite and the virtual user node, $t_{svr}$
- location of the satellite relative to the hub, which determines a signal propagation delay between the satellite and the hub, $t_{hs}$
- ground delay associated with latencies in the hardware on both the hub and the user node, $t_{gd}$
- frame rate, F
- maximum frame start delay, $FSD_{max}=1/F-k$, where k is a constant that accommodates satellite movement from its "center" location to its location when it is closest to earth.

$$H_{fsd}=\text{mod}\,[(2t_{hs}+2t_{svr}+t_{gd}+FSD_{max}),1/F]$$

The $R_{fsd}$ calculation for each user node is based on:
- hub frame start delay, $H_{fsd}$
- location of the user node relative to the satellite, which determines a signal propagation delay between the satellite and the user node, $t_{srn}$
- location of the hub relative to the satellite, which determines a signal propagation delay between the hub and the satellite, $t_{hs}$ frame rate, F
ground delay associated with latencies in the hardware on both the hub and the user node, $t_{gd}$ $$R_{fsd}=1/F-\text{mod}\ [(2t_{hs}+2t_{srn}+t_{gd}-H_{fsd}),\ 1/F]$$

Calculation and Distribution of $R_{fsd}$

The $H_{fsd}$ is calculated during initialization on the hub receiver using pre-configured hub and satellite location, and frame rate. Each user node is pre-configured with its location, or determines its location from a GPS input. Frame rate, and other user node parameters, including upstream symbol rate, are sent to each user node via the downstream channel and stored at the respective user node before the user node acquires into the network. When each user node is instructed to acquire into the network, it is also informed of the $H_{fsd}$ (or of the variables needed to calculate it locally), the location of the satellite, and the location of the hub. The user node calculates a $R_{fsd}$ based on this information, prior to transmission. This method accommodates both static and mobile user nodes, and the movement of the satellite—since the user node recalculates the $R_{fsd}$ each time the user node is instructed to acquire into the network.

As stated earlier, the hub transmitter uses the hub transmitter's TxSOF to start transmitting a new downstream frame in the modulator. At each user node, this downstream frame boundary is delimited and a receive start of frame RxSOF is generated. The RxSOF on each user node is delayed by a programmable frame start delay $R_{fsd}$, calculated as above. With the $R_{fsd}$ applied at each user node, the start of all upstream frame times arrive simultaneously (i.e., within the ability of the hub demodulator to demodulate the burst within the same symbol time) at the satellite, and hence simultaneously at the hub receiver. Individual bursts within the frame are controlled by the BTP, see below. At the hub receiver, each upstream arrives at a fixed offset, $H_{fsd}$ relative to the hub transmitter's TxSOF, so that the generated RxSOF time period coincides with the start of the upstream frame. This allows the bursts to be extracted from the demodulated signal.

Figure 1:
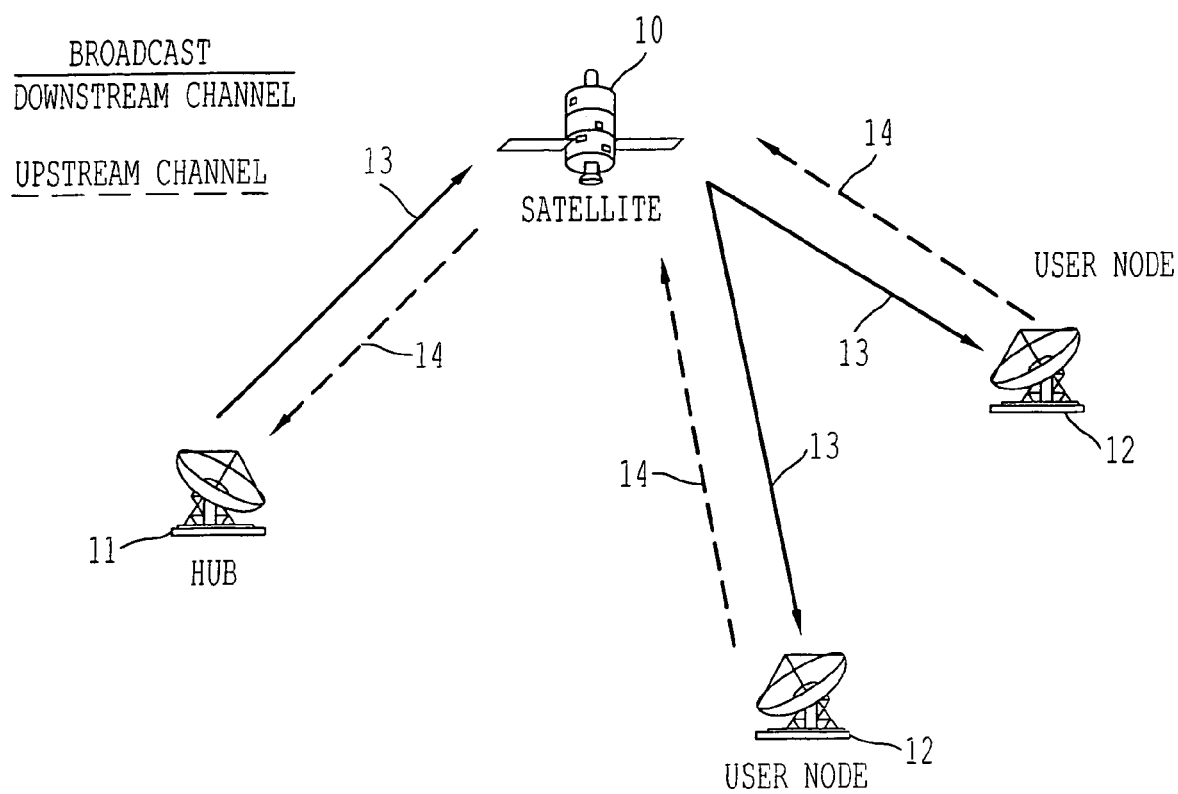
FIG. 1 illustrates a conventional communication network system.
Figure 2:
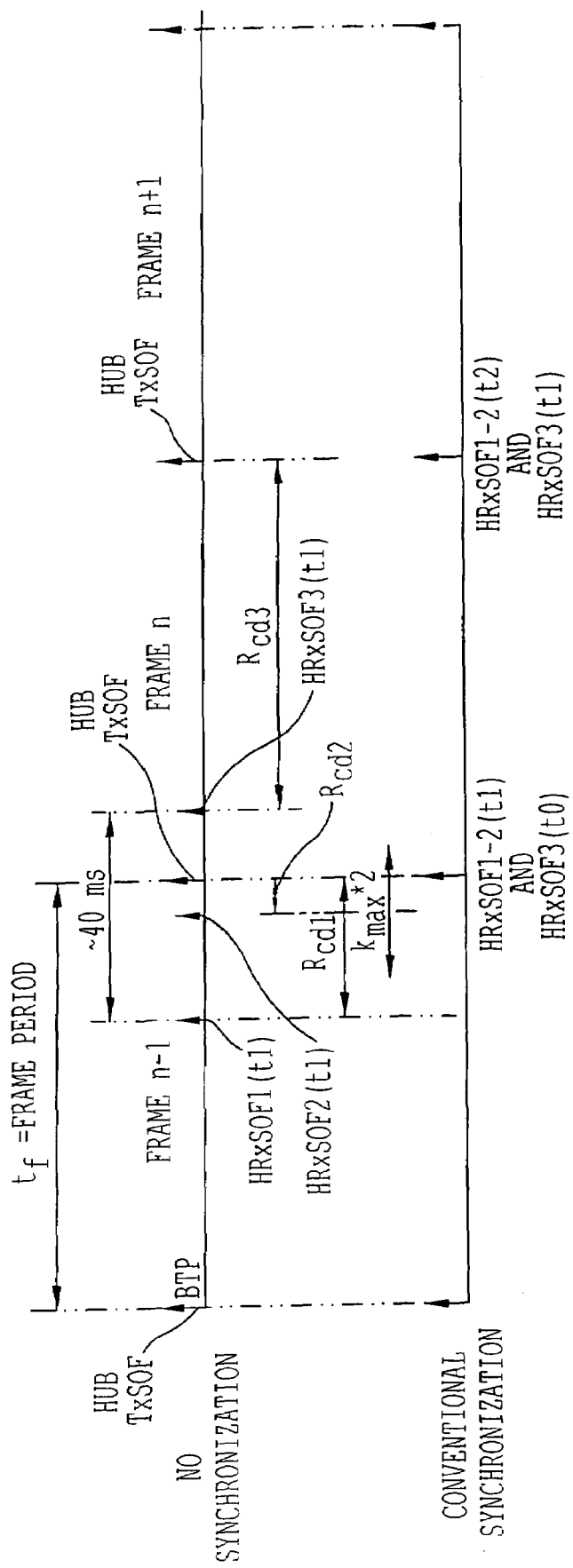
FIG. 2 is timing diagram of a conventional communication network system.

To illustrate an embodiment of the invention with respect to a conventional approach, FIGS. 2 and 5 illustrate the following three timing scenarios: No Synchronization (FIG. 2), Conventional Synchronization (FIG. 2), and Synchronous BTP Timing (FIG. 5). In each scenario, HRxSOFn(ta) represents the nominal time a start of a frame time period, Start of Frame (SOF), is received from user node "n," and $k_{max}*2$ represents the maximum variation of reception time, for the worst case user node, due to minor perturbations in satellite position. The frame's relative frame sequence is "a."

In the No Synchronization scenario, SOFs are unconstrained and arrive at various times due to variations between the propagation delays of each user node. In this example, SOFs from user nodes 1 and 2 transmitted at frame sequence t1, HRxSOF1(t1) and HRxSOF2(t1), respectively, are received at the hub prior to the hub TxSOF for frame n, while the SOF from user node 3 transmitted at frame sequence t1, HRxSOF3(t1), is received at the hub after the hub TxSOF for frame n. In the Conventional Sync scenario, a delay time $R_{cdn}$ (Remote Conventional Delay for user node n) is added at each user node so that the SOFs from each user node are received synchronously, coincident with a hub TxSOF. The diagram illustrates two problems with this conventional approach:

1. Although the conventional approach nominally synchronizes HRxSOFn of each user node, each particular user node is suffering under a different tracking error at any given time. Thus, tracking error may result in some of the HRxSOFn being received during hub frame n and some HRxSOFn being received during hub frame n-1. In this example, HRxSOF2 is received less than half of the total variation of reception time due to satellite perturbations, or $k_{max}$, before the hub TxSOF, thus, depending upon the current location of the satellite, HRxSOF2 is sometimes received during frame n-1 and synchronized to the Hub TxSOF for frame n and sometimes received during frame n and therefore synchronized with hub TxSOF for frame n+1, resulting in unpredictable timing.

2. The Conventional Synchronization approach results in simultaneous arrival of SOFs sent at different times in the frame sequence. In this example, HRxSOF1(t1) and HRxSOF2(t1) both transmitted at frame sequence t1, are synchronized with HRxSOF3(t0), which was transmitted during the previous time period, t0 as shown in FIG. 2.

Figure 7:
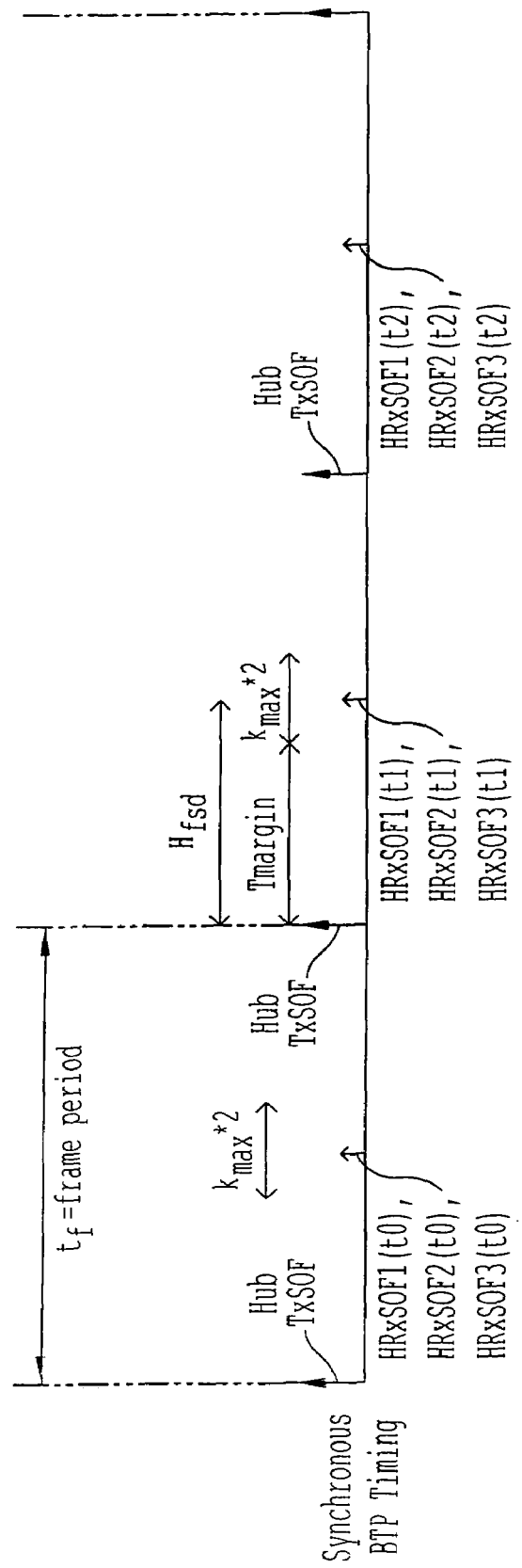
FIG. 7 is an example timing diagram of synchronous BTP according to the present invention.

FIG. 7 illustrates signal timing at a hub with synchronous BTP according to an embodiment of the invention. HRxSOF1, HRxSOF2, and HRxSOF3, are each received simultaneously at the hub. The time of arrival of these HRxSOF signals is $H_{fsd}$ after each hub TxSOF. Further, the HRxSOF1, HRxSOF2, and HRxSOF3 received simultaneously, were all transmitted relative to the same frame sequence from their respective user nodes. $k_{max}*2$ indicates the potential variation in time of receipt of each HRxSOF signal due to variation in satellite position, and $T_{margin}$ represents the amount of time from the preceding TxSOF until the earliest potential arrival time of the HRxSOF signals.

The timing in FIG. 7 illustrates an exemplary solution to both problems described above. First, a time $H_{fsd}$ is added to each user node to shift the arrival times of all SOFs closer to the middle of a hub frame time, such that Tmargin is maximized, and so the user node closest to the satellite has the maximum $R_{fsd}$. Second, $R_{fsd}$ is selected for each user node (based on $H_{fsd}$) such that SOFs are received simultaneously with respect to frame sequence. Thus, in this example, all SOFs received at HRxSOF1-3 in FIG. 7 were transmitted by user nodes at the same frame time in the sequence of frame times transmitted by each user node.

Figure 8:
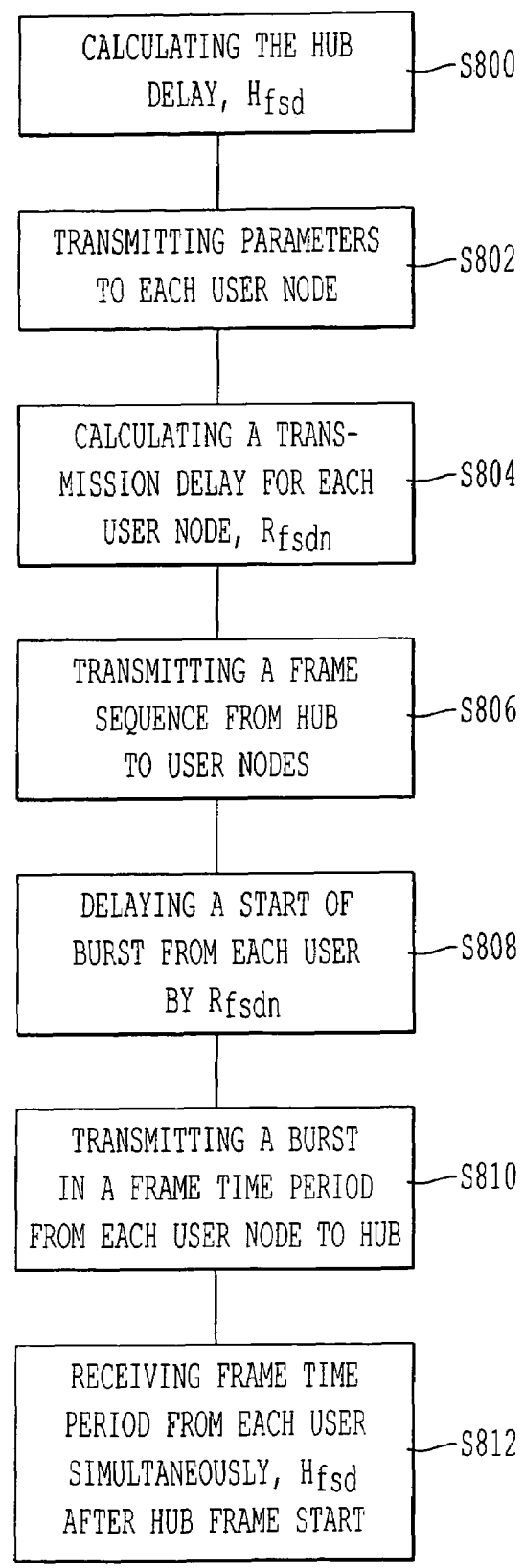
FIG. 8 is a flow chart of a communication network control method according to the present invention.

A communication network control method according to an embodiment of the invention is further illustrated in FIG. 8. The process begins in step S800, where the hub delay is calculated. The process then processes to step S802, where the hub delay and other parameters are transmitted to each user node. The process continues in S804, where a transmission delay for each user node is calculated using the received parameters and received $H_{fsd}$. Next, in step S806, the hub transmits a sequence of frames to each of the user nodes. Further, the process continues in step S808, where each burst is delayed by $R_{fsd}$, and each of the user nodes transmits data bursts in a frame time period to the hub, in step S810. Finally, in step S812, the frame time, including data bursts from each user node, are received simultaneously at the hub, $H_{fsd}$ after the start of a hub frame time. Thus, the $R_{fsd}$ for each node is selected to ensure that data burst frame times from each user node arrive at the satellite simultaneously, and are then transmitted to the hub, where they are also received in their respective slots according to the frame timing.

BTP Synchronization

Frame synchronization as detailed above provides the ability for bursts within a frame to be optimally used without the fear of a burst from one user node colliding with the burst of another user node on the same upstream. The synchronous broadcasting of a BTP from the hub to all user nodes is used to control which upstream channel, and which bursts within that upstream channel, are enabled for a specific user node.

The hub transmitter uses the hub transmitter TxSOF to:
  generate an interrupt to the BTP process a configurable time period prior to the TxSOF. The interrupt is earlier than TxSOF to account for all hardware latencies in both the hub transmitter and user node receivers. This allows the BTP to be placed in the downstream earlier than the actual start of frame and ensures that the user node is given the maximum amount of time to process and apply the BTP prior to the start of the user node's transmit start of frame; and
  synchronize the start of the downstream frame encapsulation and FEC block boundaries.

The interrupt to the BTP Process on the hub transmitter in turn is used to:
  select the next BTP from the BTP queues and broadcast it to the downstream user nodes; and
  trigger the BTP process to send a message to the central control server On detection of the BTP request message, the DA process on the central control server sends a new BTP to the hub transmitter. The hub transmitter inspects packets coming from the central control server and transmits those containing BTPs ahead of other enqueued packets.

On each user node, the BTP is extracted from the downstream frame by the BTP process and applied to the burst controller immediately. At the appropriate time, the burst controller enables the modulator to transmit data onto the selected upstream carrier. The BTP determines both the frequency of the burst and in which slot or slots in the frame the data is transmitted.

A failsafe mechanism prevents errant BTP from being applied to the burst controller.

Figure 9:
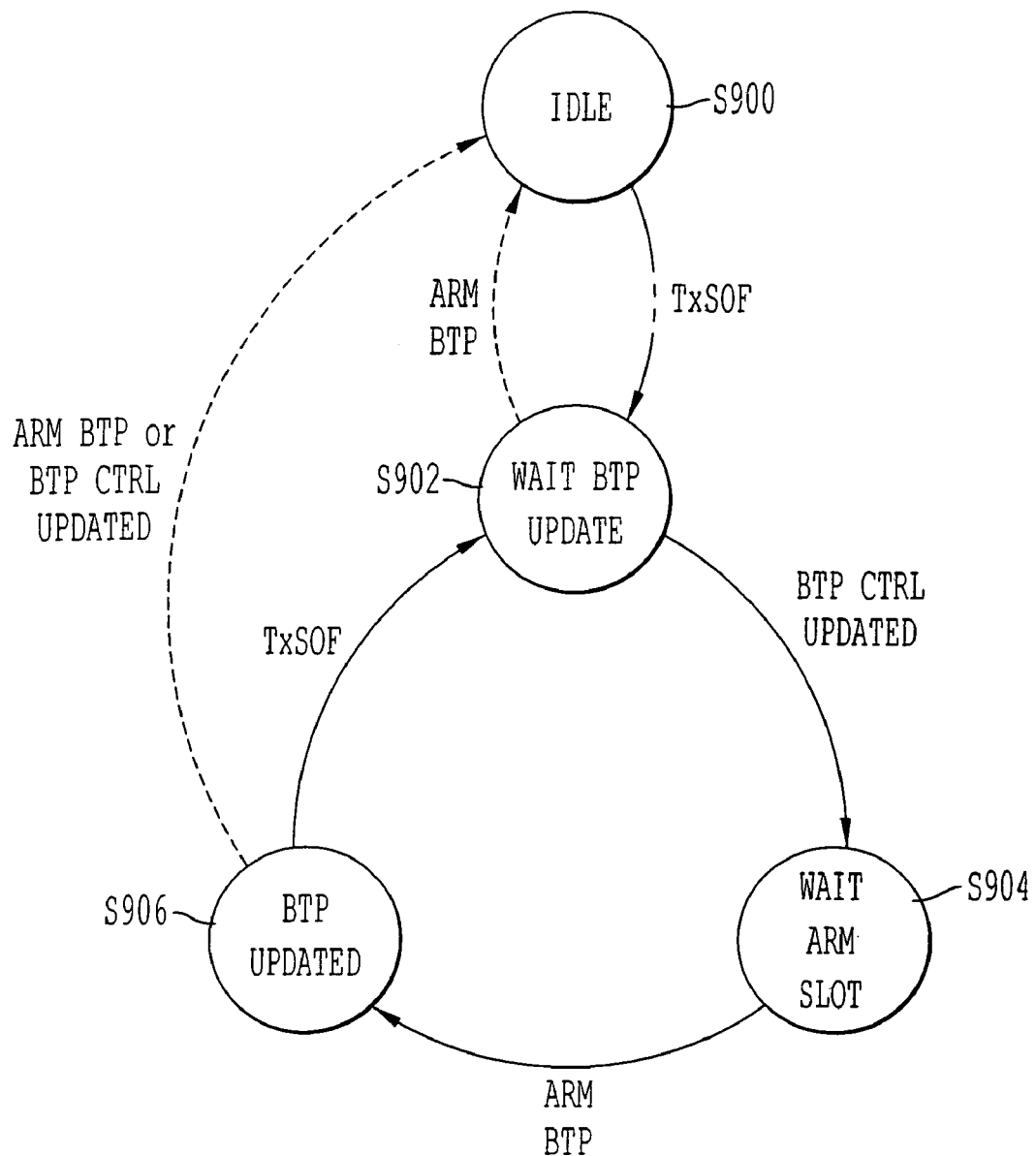
FIG. 9 is a failsafe method state diagram according to the present invention.

FIG. 9 illustrates the sequence of events in an exemplary embodiment of BTP synchronization by the burst controller each frame. First, the TxSOF pulse occurs, bringing the process to step S902, where it waits for a BTP update. Then the BTP memory is updated with the next frame's information, which brings the process to step S904 where it waits for the BTP to be armed. Finally the BTP is armed bringing the process to step S906 which indicates that data will be sent when the current time slot number matches any that are allocated to the node for the current frame. In the event that the correct sequence is not followed, the process is brought back to step S900, and the BTP is ignored until a valid sequence has been received and no further bursts are transmitted in the interim. A failsafe mechanism is needed because it is possible, due to factors such as excessive processor loading, that an incorrect sequence may occur that could apply an incorrect BTP and cause collisions.

A BTP process is also running at each hub receiver and is applied to a burst controller. Since there is an integer number of frame times "n" from the time a burst is transmitted at the hub to the time when a return burst arrives at the hub receiver (taking into consideration $H_{fsd}$), synchronization is advantageously simplified. The hub buffers "n" BTPs and applies the BTP that was sent "n" frames previously. The burst controller at the hub receiver informs the demodulator as to which modulation and FEC to use since it knows the current settings of the node that sent each burst.

Demand Assignment Process

The DA process ensures that TDMA slots on the upstream channel are allocated in a manner consistent with the resource sharing rules specified by the network operator or user. These rules are applied on a node-by-node basis and involve rate shaping and Quality of Service (QoS) priorities.

Rate shaping rules govern the data rate allocated to a user node, such as a minimum, maximum, or Committed Information Rate (CIR=guaranteed when required). A benefit of this process is that there is no requirement that this data rate maps evenly to a number of TDMA slots, and therefore the network operator defining the rate shaping rules may be agnostic to the TDMA implementation.

QoS priority rules govern the relative priority of different types of data that may arrive at the user node and destined for the hub or a destination on a network (such as the internet) connected to the hub. It is quite common for several user nodes to have identical rules. For example, the network operator may choose to limit all nodes to a maximum of 100 kbps. When allocating slots to user nodes with identical rules, the DA divides the slots equally.

Figure 10:
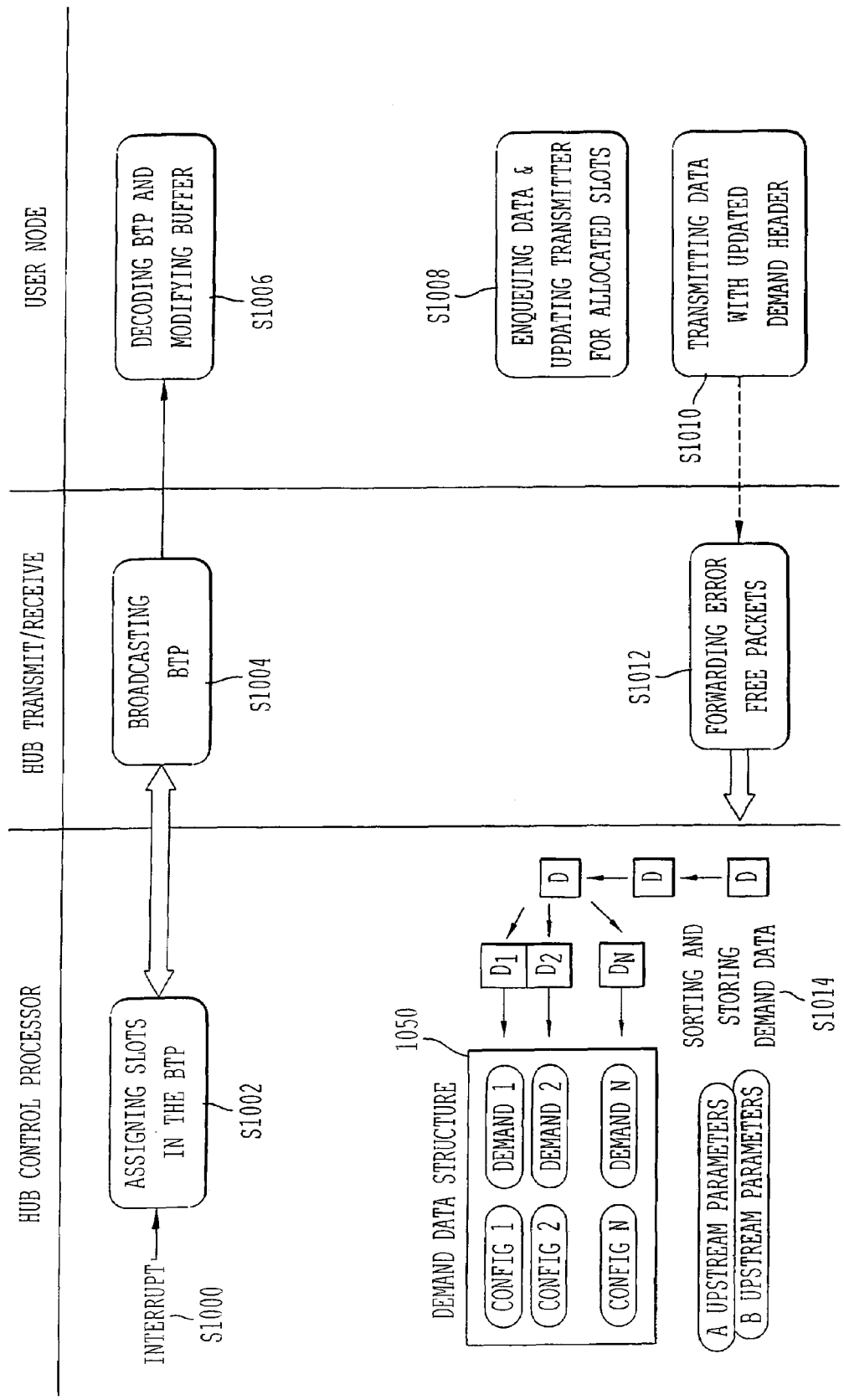
FIG. 10 is a demand assignment signal flow diagram in a communication network control method according to the present invention.

FIG. 10 illustrates an exemplary embodiment of the Demand Assignment Process. An interrupt S1000 occurs at a programmable interval triggered by a frame marker in the hub transmitter. A Burst Time Plan (BTP) generator assigns TDMA slots based on data structure and upstream parameters in the central control server, in step S1002. BTP is multiplexed into a downstream broadcast channel in the hub transmitter, in step S1004. BTP is decoded by each node, and internal buffering is modified based on the number of slots to be transmitted in the upcoming frame in step S1006. Each node updates its transmitter to schedule bursts on the TDMA slots it has been allocated on the upcoming frame in step S1008, and synchronous BTP firmware ensures that data is transmitted during scheduled slots with an updated Demand Header added in S1010. In the hub receiver, TDMA bursts are received and error checked. Good (i.e., not detected as being corrupted) packets are forwarded to the central control server in step S1012. In the central control server, demand data is sorted, in step S1014, by user node into its corresponding position in a Demand Data Structure 1050.

DA at the User Nodes

Components of the DA Process exist at every user node where demand information is collected and packets are queued according to the current allocation of TDMA slots. Every single packet that is transmitted over the upstream channel is prepended with a header to reflect the current demand levels of the user node at the time when that packet was sent. This ensures that the DA decisions made by the central control server are using the most current information possible.

Figure 11A:
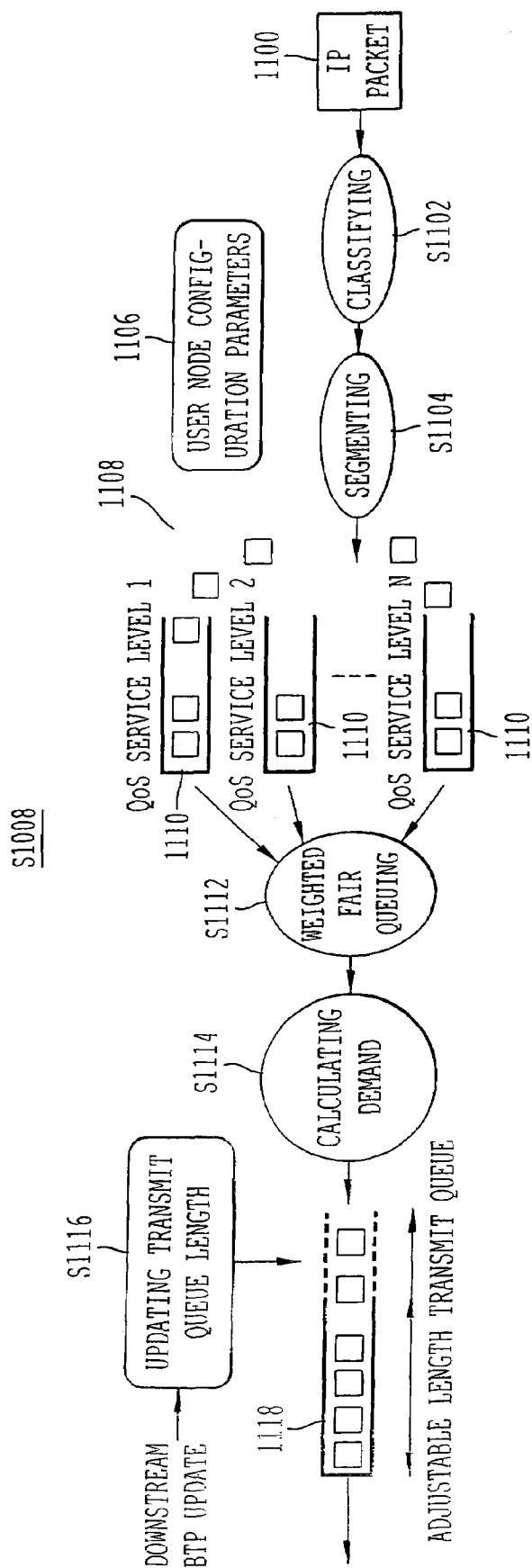
FIG. 11A is a queuing diagram for a communication network control method according to the present invention.

FIG. 11A illustrates an exemplary embodiment of a portion of the DA process at the user nodes. In this example, the process uses a queuing system that separates data into different queues according to QoS service levels, a demand calculator, and an adjustable length transmit queue. Each IP packet 1100 arriving from a user node LAN is classified according to the QoS Service Level Rules specified by the network operator in step S1102, and then segmented into blocks the size of the TDMA payload in step S104. Segments 1108 are distributed into different queues 1110, each corresponding to a different QoS Service Level, and then segments are taken from Service Level queues by a weighted fair queuing step S1112, appended with DA Headers in step S1114 and placed into the Transmit Queue 1118 based on the weighted priority of each QoS Service Level.

Latency is minimized by adjusting the length of the Transmit Queue 1118, in step S1116, in proportion to the number of TDMA slots allocated to the user node on the upcoming frame, based upon the BTP updated via downstream update on every frame.

The queuing system uses service levels defined by a set of rules describing properties of an incoming packet. A simple QoS configuration may designate one service level for TCP packets, another for UDP packets, and another for everything else. More complex service levels are defined according to IP address ranges, TCP port numbers, or any other parameters that are used to classify packets. It is important to note that the data units enqueued in these service level queues are not complete IP packets, rather, they are segmented packets divided up such that each segment fits into the payload portion of a TDMA burst. By segmenting, finer granularity is achieved so the weighted fair queuing decisions are made on a burst-by-burst basis using identical sized units, rather than on a packet-by-packet basis using variable sized units. The result of using this segmentation is a lower latency, optimally fair queuing system because it avoids the situation where a large packet monopolizes the transmit queue while other packets (potentially of higher priority) build up in the service level queues.

Each service level queue has two associated "flags" to identify special properties of the queue: the Committed Information Rate (CIR) Trigger flag, and the Real Time flag. The flags are either checked or unchecked by the network operator when the QoS rules for the service level are specified. If the CIR Trigger flag is checked for a given service level, the queue is authorized to request that the user node be granted bandwidth, up to the CIR specified by the network operator in the rate shaping rules, for as long as segments are pending in that queue. Similarly, if the Real Time flag is checked for a given service level, the segments in that queue are given Real Time status when calculating the total demand of the user node. CIR Trigger status and Real Time status are mutually inclusive because a network operator may, for example, want to designate VoIP traffic as Real Time and also allow that traffic to request the CIR specified for that node.

The demand calculator is essentially a compression method in that it collects complex information about the demand of the user nodes and compresses it into a very small header summarizing the information. Communicating the node's demand concisely is important for two reasons. First, bandwidth on the upstream channel is a precious commodity due to the cost of the satellite segment and the fact that the channel is shared by many users. Wasting too much bandwidth on demand request overhead diminishes the overall benefit of a demand driven system. Second, limiting the number of input parameters to the DA process on the central control server serves to simplify its implementation, thereby increasing the speed with which decisions may be made.

The three fields in the demand header are Total Demand, % Real Time Demand, and CIR Trigger. Total demand is equal to the total number of TDMA slots required to satisfy the demand at the user node. An additional overhead factor may be used to increase the Total Demand number to account for the overhead data, such as the demand headers themselves, which are sent with the segments. The % Real Time Demand is a number that represents the percentage of the Total Demand generated by service level queues flagged as Real Time. The CIR Trigger is a flag in the header that is checked if any of the service level queues with CIR Trigger status contain pending segments.

The adjustable length transmit queue at each user node optimizes latency and throughput of the upstream channel by avoiding two situations which could cause sub-optimal performance. The transmit queue "pulls" a segment from the service level queues when the number of queued packets falls below the current queue length threshold. Consider a situation where five segments are in the transmit queue of a user node but 10 TDMA slots have been allocated to the node for the current frame. In this situation, the upstream transmitter may transmit all five segments before the transmit queue can "pull" five more and the result is that five transmission opportunities were missed and hence, bandwidth has been wasted. Consider a second situation where many low priority segments are enqueued in the transmit queue waiting to be sent while higher priority segments may have subsequently arrived at a high priority service level queue. In this case, the weighted fair queuing algorithm has already made a decision to put the low priority segments into the transmit queue because it didn't know that a high priority segment was going to arrive. Now the high priority segment waits in the service level queue until the transmit queue can accommodate it, hence the high priority segment's latency is increased and the relative priority wishes of the network operator have not been optimally honored.

In theory, a solution to this problem would be to have no transmit queue at all and to take packets directly from the service level queues and feed them directly into the upstream transmitter. In practice, however, it is very difficult to synchronize the timing of the frames (which must be accurate to the resolution of one modulation symbol time) with the user node's control processor (whose response time varies with loading). Therefore, a good solution is to adjust the length of the transmit queue in direct proportion to the number of TDMA slots (transmission opportunities) that have been allocated to that node for the current frame. The proportionality constant governing the relationship between allocated slots is implementation dependent. In the case where the frame is fairly long and the control processor on the user node is fairly fast, a proportionality constant less than one is chosen to yield a transmit queue shorter in length than the number of slots allocated. Conversely, if the upstream frame is short and the processor is relatively slow, a proportionality constant greater than one is chosen to avoid wasting transmission opportunities.

Figure 11B:
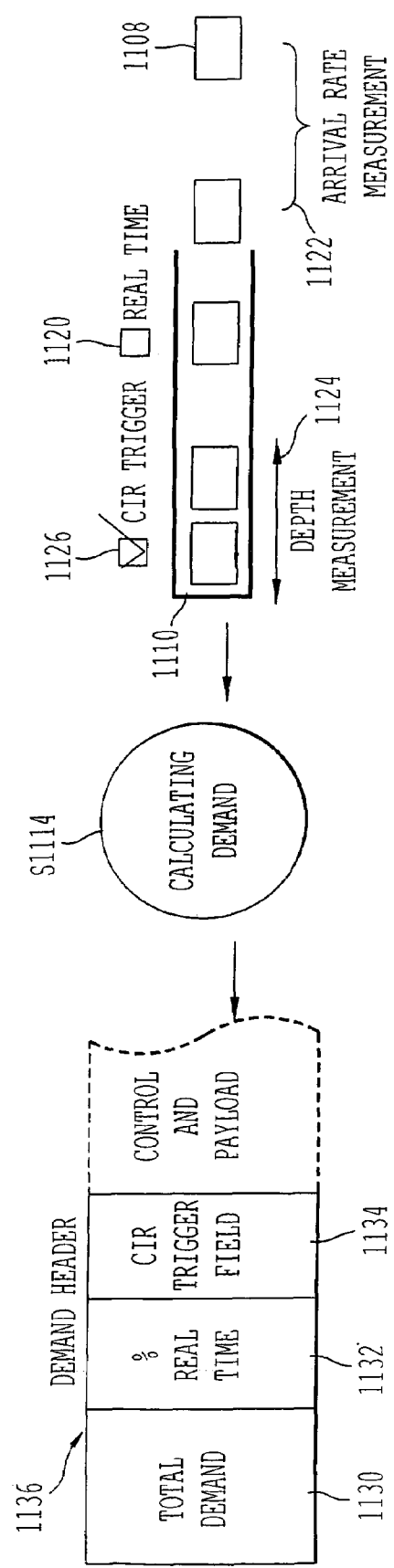
FIG. 11B is a diagram of a demand header calculation process in a communication network control method according to the present invention.

FIG. 11B further illustrates an exemplary embodiment of the present invention including the collection of parameters from each Quality of Service Queue 1110. The collected parameters include a CIR Trigger 1126, Real Time 1120, Arrival Rate Measurement 1122, and Depth Measurement 1124. In this example, these collected parameters and the configuration of the associated queue are used by a calculating demand step S1114 to calculate new demand header 1136 values every time a segment is transmitted. The demand header 1136 includes a total demand field 1130, which represents the total number of slots required to satisfy the demand, a % real time field 1132, which represents the percentage of the total demand generated by queues marked as Real Time, and a CIR trigger field 1134, which indicates whether any of the demand is generated by queues that are entitled to request that the user node's CIR be allocated.

Figure 12:
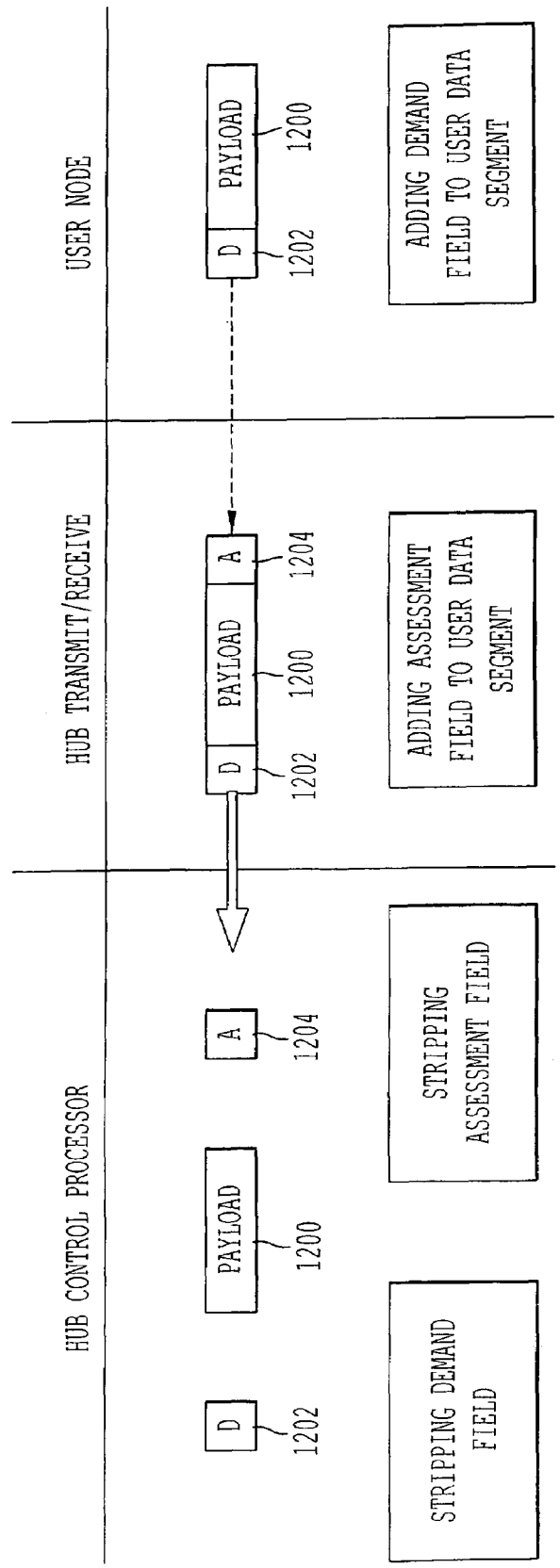
FIG. 12 is a communication network control method signal flow diagram according to the present invention.

FIG. 12 illustrates upstream packet flow in an exemplary embodiment of the invention. In a user node in this example, a demand header 1202 is added to each TDMA packet or payload 1200. In the hub receiver, an assessment trailer 1204 is added to each payload 1200. In the central control server, the assessment trailer 1204 and demand header 1202 are stripped from the payload and sent to the Upstream Control Process and the Demand Assignment Process, respectively.

DA at the Central Control Server

A decision-making component of the DA process resides at the central control server. Inputs to the DA decision module are real time estimates of each user node's demand, configuration parameters for the upstream channel group consisting of one or more upstream channels, rate shaping rules defined by the network operator for each user node, and high level priority directives governing the relative priority of Real Time, CIR, and statically assigned TDMA slots.

Figure 13:
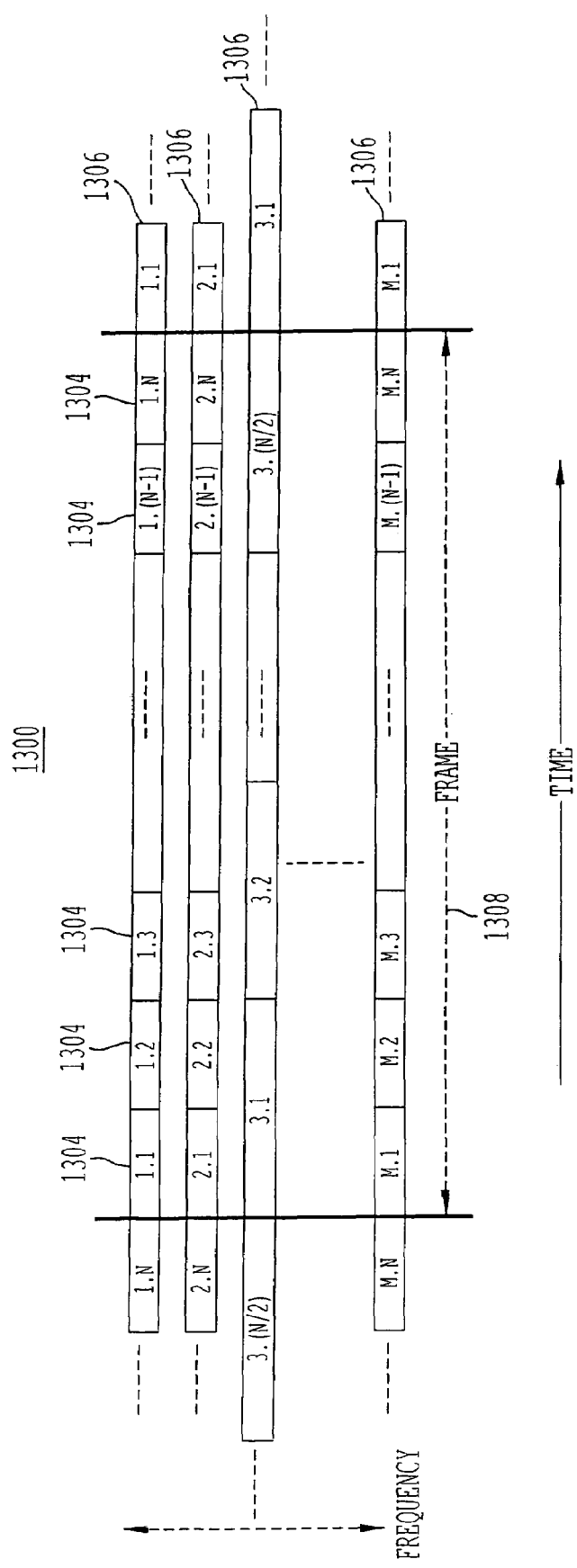
FIG. 13 is a channel group diagram for a communication network control method according to the present invention.

FIG. 13 illustrates an embodiment of an Upstream Channel Group 1300 with M Channels 1306, each on a separate frequency, with N (or a multiple of N) time slots 1304 repeating every Frame 1308.

The demand assignment decision process is started every frame by the hub transmitter by sending a BTP request packet to the central control server shortly before a new frame starts. When the decision process is kicked off, a demand-driven slot allocation decision is made to dole out a certain number of slots to each user node. The list of user nodes and the number of slots each has been awarded is passed to the feathering algorithm to optimally spread the allocated slots over the frame so as to minimize the amount of packet jitter that will be introduced by the system. Finally, and without changing the feathering that was just performed, the slots assignments are divided up into separate upstream channels and placed into a BTP packet which is sent to the user nodes via the downstream channel. An additional step modifies the BTP in order to minimize the number of times each user node will have to hop in frequency between upstream channels in order to use all the transmission opportunities it has been awarded.

Figure 14:
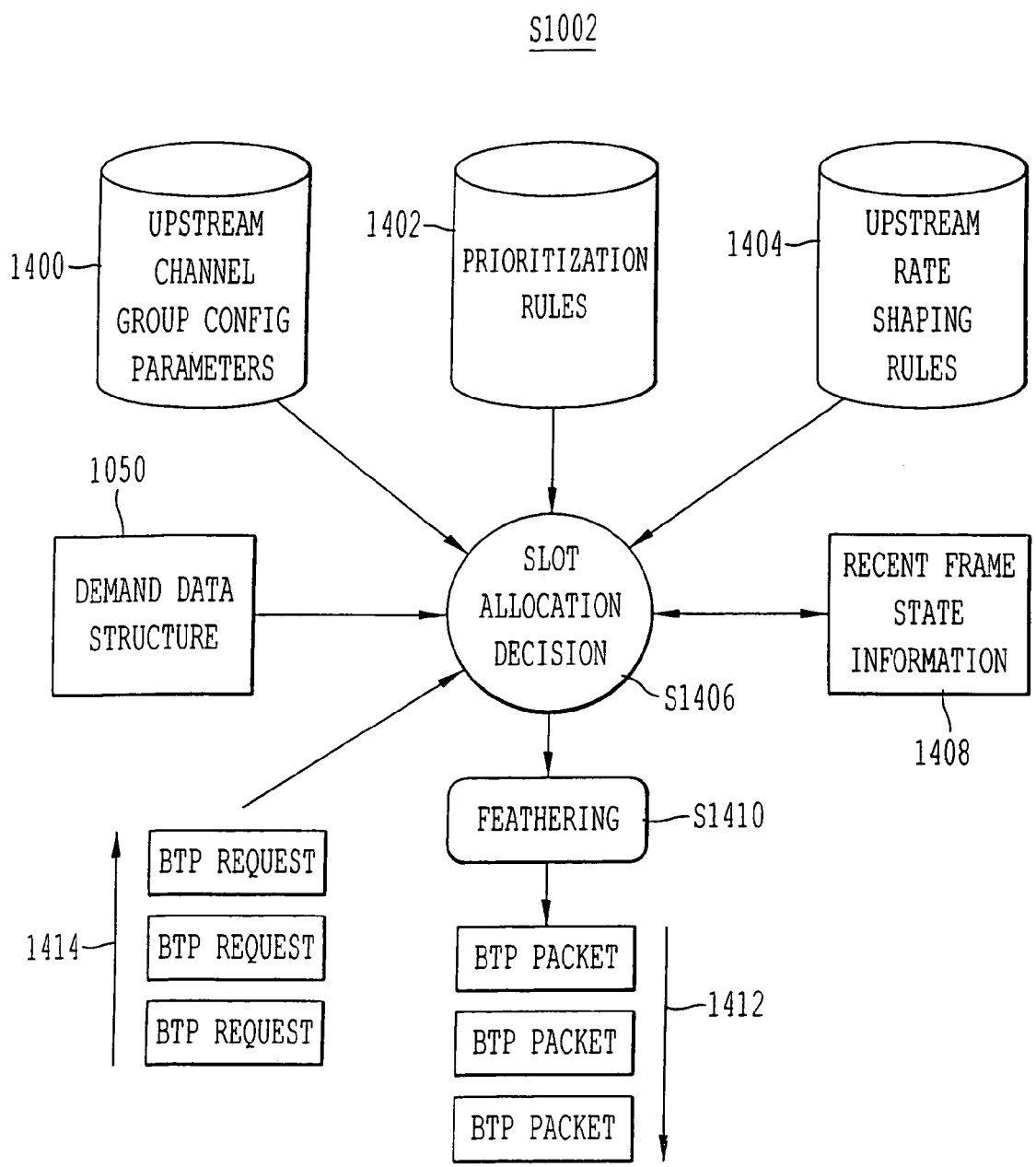
FIG. 14 is a slot allocation process flow diagram for a communication network control method according to the present invention.

A detailed view of an exemplary embodiment of the DA is illustrated in FIG. 14. A demand driven Slot Allocation Decision S1406 is made once per frame (i.e., each time a new BTP Request 1414 is received), and is based upon inputs from Upstream Channel Group Configuration Parameters 1400, Prioritization Rules 1402, Upstream Rate Shaping Rules 1404, Recent Frame State Information 1408, and Demand Data Structure 1050. Feathering S1410 is performed to spread slot allocations across the frame time period to minimize upstream jitter, and a new BTP Packet 1412 is sent every frame to the hub transmitter which multiplexes it into the downstream channel.

For example, an embodiment of the present invention may include the following upstream channel configuration parameters (additional discussion of the parameters follows the example):

100 slots per frame two upstream channels each at 1 Mbps

10 Frames per second

In this example, the following prioritization rules are applied in this order:

1) Minimum Data Rate:
2) CIR
3) Real Time Data

Example Rate Shaping Rules:

| NODE | Minimum Rate | Maximum Rate | CIR |
|---|---|---|---|
| A | 10 kbps | 50 kbps | 20 kbps |
| B | 20 kbps | 1000 kbps | 0 |
| C | 10 kbps | 500 kbps | 100 kbps |

-continued

Example Rate Shaping Rules:

| NODE | Minimum Rate | Maximum Rate | CIR |
|---|---|---|---|
| D | 50 kbps | 100 kbps | 100 kbps |
| E | 10 kbps | 50 kbps | 0 |
| F | 20 kbps | 50 kbps | 30 kbps |
| G | 10 kbps | 1000 kbps | 50 kbps |
| H | 50 kbps | 100 kbps | 100 kbps |

Example Real Time Demand Information (for current frame time)

| NODE | Total Demand | % Real Time | CIR |
|---|---|---|---|
| A | 0 slots | 0 | No |
| B | 80 slots | 0 | No |
| C | 40 slots | 25% | No |
| D | 10 slots | 0 | Yes |
| E | 0 slots | 0 | No |
| F | 5 slots | 0 | No |
| G | 60 slots | 0 | Yes |
| H | 40 slots | 50% | No |

Example Demand Assignment Decision Process Explanation

Two upstream carriers with 100 slots per frame each results in 200 slots available for the current frame.

235 slots requested so DA will have to make a decision.

Per the Example Prioritization Rules, the Minimum Data Rate is satisfied first for all nodes regardless of their current demand. Since a single slot represents 1 kbit of data, a minimum rate rule of 10 kbps is satisfied by allocating at least one slot per frame.

one slot contains 1000 data bits.

Example slot allocation after satisfying the minimum data rate constraint:

| NODE | Slots |
|---|---|
| A | 1 slot |
| B | 2 slots |
| C | 1 slot |
| D | 5 slots |
| E | 1 slot |
| F | 2 slots |
| G | 1 slot |
| H | 5 slots |

A total of 18 slots have been allocated in this example and 182 slots remain free.

Per the prioritization rules, CIR is satisfied next.

Node D is requesting 10 slots which equates to 100 kbps. Node D's CIR flag is checked and is allowed a CIR of 100 kbps. Node D has already been allocated 5 slots to satisfy it's minimum rate rule so it is allocated another 5 to satisfy its demand.

Node G is requesting a total of 60 slots which equates to 600 kbps. Node G's CIR flag is checked and its CIR is 50 kbps. Node G already has 1 slot so it is given 4 more to satisfy its CIR.

The example allocation after satisfying CIR is:

| NODE | Slots |
|---|---|
| A | 1 slot |
| B | 2 slots |
| C | 1 slot |
| D | 10 slots |
| E | 1 slot |
| F | 2 slots |
| G | 5 slots |
| H | 5 slots |

A total of 27 slots have been allocated and 173 slots remain free.

Per the example prioritization rules, Real Time demand is satisfied next.

Node C is requesting 40 slots and 25% (or 10 slots) of its demand is Real Time. It already has one slot and it is allocated 9 more to satisfy all Real Time demand.

Node H is requesting 40 slots and 50% (or 20 slots) of its demand is Real Time. To completely satisfy Node H's Real Time demand, it would need 15 more slots to increase its total to 20 slots. However since that would equate to a data rate of 200 kbps, the maximum rate constraint of 100 kbps would be violated. Therefore, Node H is allocated 5 more slots for a total of 10.

The Allocation after Satisfying Real Time demand:

| NODE | Slots |
|---|---|
| A | 1 slot |
| B | 2 slots |
| C | 10 slots |
| D | 10 slots |
| E | 1 slot |
| F | 2 slots |
| G | 5 slots |
| H | 10 slots |

At this point in the example, a total of 41 slots have been allocated and 159 slots remain free.

Now that all high level prioritization rules have been followed, the remainder of the slots will be allocated to honor as much of the remaining demand as possible.

Nodes B, C, F, G, and H still have "general demand" that has not been satisfied however Node H has already been allocated its maximum so it will get no more slots.

Doling out the remaining slots equally would yield 39.75 slots for each of the 4 nodes.

Two of these four nodes don't need 39.75 slots; Node C needs 30 more and Node F needs 3 more. The demand for these two nodes is satisfied leaving 126 slots left.

The two other nodes B and G may split up the remaining 126 slots 63 each but G only needs 55 more so its demand is satisfied leaving 71 slots remaining for Node B.

The Final example allocation after satisfying as much remaining demand as possible:

| NODE | Slots |
|---|---|
| A | 1 slot |
| B | 73 slots |
| C | 40 slots |
| D | 10 slots |
| E | 1 slot |
| F | 5 slots |
| G | 60 slots |
| H | 10 slots |

A total of 200 slots have been allocated and 0 slots remain free.

Example Allocation Summary:

Node B's demand was not completely satisfied because there were not enough slots available.

Node H's demand was not completely satisfied because it requested more than its maximum bandwidth.

Nodes A and E each received a slot even though they did not ask for one since their minimum rate constraint dictated that it must get at least one slot per frame.

All the variables input to the DA decision component may be set up at system initialization (or when a network operator intervenes) with the exception of the real time demand information which is stored in a data structure and is constantly updated.

During times of low network loading when the total number of slots requested does not exceed the total number of slots available, the DA has no decision to make. The DA gives every node the number of slots it asked for, feathers them across the frame, and sends the BTP. The most significant benefit of this approach is realized when network loading is high and user nodes are requesting far more slots than the DA can give them. In fact, if the QoS service level queues are set deep enough at a given node, the node may request to use as many slots as possible. If the node is only able to transmit on one carrier at a time the node may request to use every slot in the frame of a given upstream. If the node has multiple transmitters, it may ask for every slot on all upstream channels. When one or more nodes requests more than their share, DA enforces the rules.

To enforce rate-shaping rules, the DA pre-computes the equivalent bit rate of one slot per frame. For example, if there are 10 bits per slot, 10 slots per frame, and frames per second, the bit rate of a single slot per frame is 100 bits per second. If a maximum rate rule of 200 bits per second is specified for a given node, DA ensures that no more than 2 slots are allocated to that node on any given frame. Similarly, if a minimum rate rule of 100 bits per second is specified for a given node, DA ensures that at least one slot per frame is allocated to that node on every frame. CIR rules are similar and may be considered variable minimum rate constraints. If a node has a CIR equivalent to 4 slots per frame, DA allocates at least 4 slots when the node demands 4 slots or more, however it need not allocate any slots if there is no demand.

A new problem is introduced if a minimum rate rule of less than one slot per frame, for example 50 bits per second, is defined. This case requires that the DA process store state information about previous frames to ensure that the minimum rate rule is enforced. In this example, DA would assign one slot every other frame to achieve a 50 bit per second rate. Traditional TDMA systems use a concept of a superframe that spans N frames to potentially assign a slot every other frame to fulfill this requirement; superframe systems send a BTP once per superframe. However, DA advantageously establishes a relationship between slots and bits per second, and by saving state information about the frames that occurred in the past second, performance equivalent to that of superframe systems is realized. And, most importantly, since DA does not have to plan ahead N frames, it can change the BTP every frame which makes the system much more responsive to changing demand than a superframe based system.

Another benefit of storing state information from several previous frames is realized in cases where there is no choice, in a given frame, other than to make an unfair decision. Consider the case where there is only one upstream channel, 10 slots per frame, three user nodes A, B, and C, and no rate shaping rules set. Assume there is high demand at all three nodes so all of them are requesting 10 slots (the whole channel). A fair decision would be to allocate 3.333 slots per frame to each node. Since it is not possible to allocate ⅓ of a slot, DA allocates 4, 3, and 3 slots to nodes A, B, and C respectively. If demand remains high during the next frame, DA remembers that A got an unfair advantage during the last frame and it therefore it allocates 3, 4, 3 to nodes A, B, and C respectively. This rotation of the unfair advantage leads to fairness on average over time.

An additional priority factor considered by the DA is the high level importance of different types of rules set by the network operator. These high level priorities are, Real Time data, minimum data rate, and CIR, in no particular order. The order of the high-level prioritizations chosen by an implementer of the DA process is not important for the algorithm to work, it is only required that some ordering be determined so that DA can "break ties" when necessary.

Figure 15:
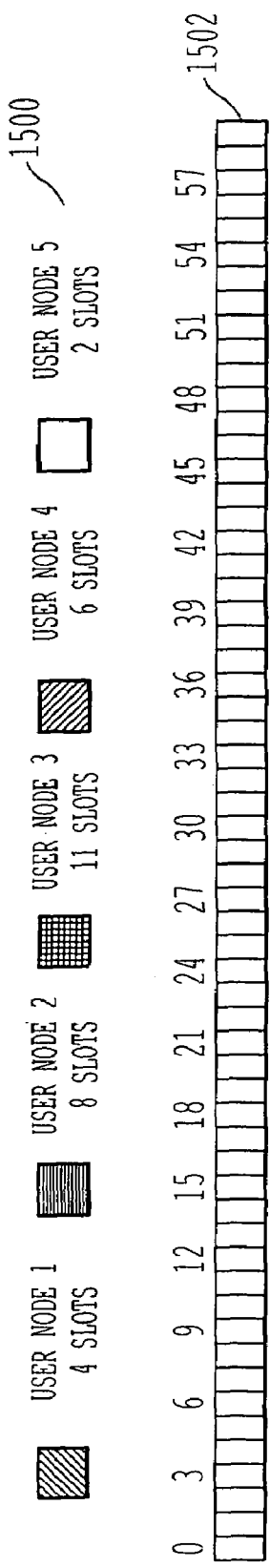
FIG. 15 is an example diagram of a feathering process for a communication network control method according to the present invention.
Figure 15:
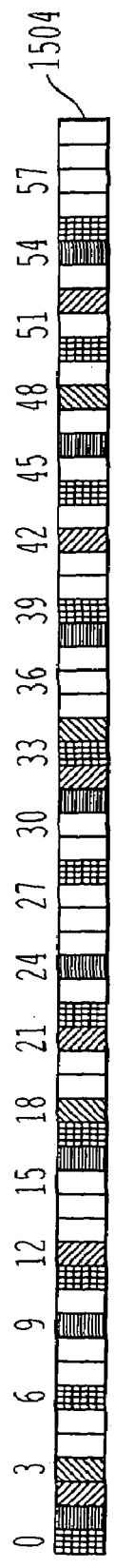
Figure 16:
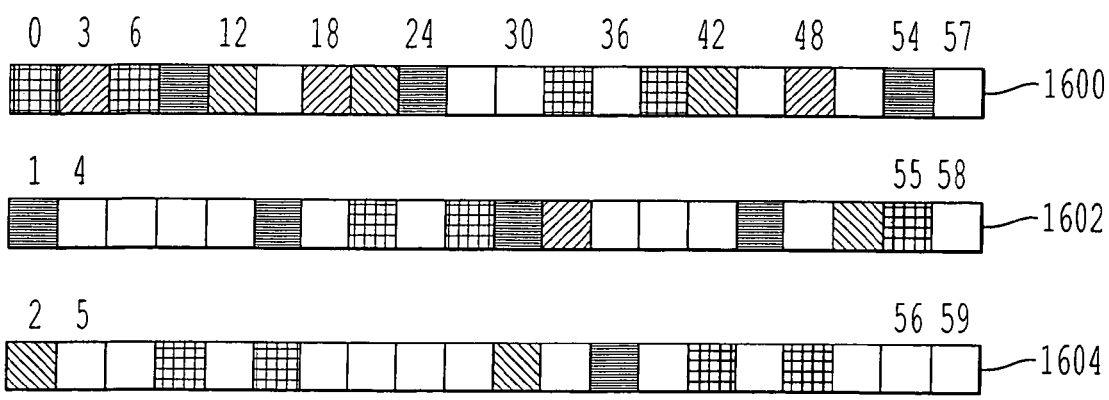
FIG. 16 is an example diagram of a feathering process across multiple channels in a channel group according to the present invention.
Figure 17:
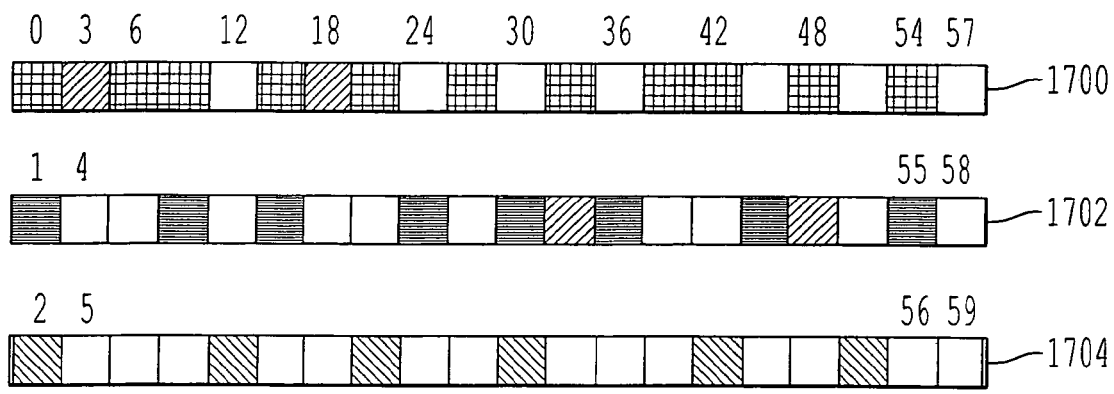
FIG. 17 is an example diagram of a feathering process to minimize channel hopping in a channel group according to present the invention.

An example of optimally feathering slots after all allocation decisions are made is illustrated in FIGS. 15-17. The feathering process begins by adding up the total number of slots available 1502 for a given frame. For example, if there are three upstream channels and 20 slots per frame, then the virtual frame 1502 is 60 slots long. Target slot assignments 1503 and slot assignments per node 1500 are calculated for every node which will equally space them throughout the virtual frame using a floating point number. For example, if 11 slots are to be allocated they would have to be allocated every 5.45 slots [0, 5.45. 10.9, 16.35, . . . 49.05, 54.5]. The numbers are then converted to integers by taking the ceiling of each [0, 6, 11, 17, 22, 28, 33, 39, 44, 50, 55]. Once a target allocation is chosen for all the nodes, they are allocated slots in the virtual frame 1504 one at a time starting with the node that will receive the most slots. The first slot in every target allocation is the 0th slot; see the example in FIG. 15 where the target allocation for Node 2 is [0, 8, 15, 23, 30, 38, 45, 53]. Since the 0th slot is already occupied, and the interval between slots must be preserved for optimal feathering, every number is shifted up by one to produce [1, 9, 16, 24, 31, 39, 46, 54]. When these slots are entered into the virtual frame 1504, they all fit except for slot 39 which is already occupied. When this happens, the interval between slots must be violated and the feathering algorithm attempts to get as close as possible to the target by shifting one slot left, then one right, then two left until an open slot is found.

Once all allocated slots have been placed into the virtual frame, it is separated into upstream channels with virtual slot 0 mapping to upstream 0, slot 0, virtual slot 1 mapping to upstream 1, slot 0, and so on as illustrated. For example, as illustrated in FIG. 16, the virtual frame is separated into three corresponding 20 slot frames, 1600, 1602, and 1604, each corresponding to an upstream channel.

It may be desirable to hop in frequency as infrequently as possible, in which case the slots may be reshuffled between upstream channels (along the frequency axis) to minimize hopping without changing the optimal feathering along the time axis. For example, as illustrated in FIGS. 16 and 17, the slots in 20 slot frames 1600, 1602, and 1604 are reshuffled to result in 20 slot intervals 1702, 1704, and 1706, respectively, which will result in reduced frequency hopping.

An alternative embodiment includes an additional constraint in the DA and feathering algorithms to restrict slot assignments that would otherwise require a frequency hop in consecutive slots. The additional constraint specifies a number of slots to be skipped when a frequency hop is scheduled. Further, these skipped slots are made available for allocation to other users so they are not wasted because the constraint applies only to the node that is currently switching frequency. This alternative embodiment advantageously provides settling time to a transmitter's analog circuitry that must settle when the frequency is changed.

Upstream Control Process

Five upstream signal parameters are adjusted in real time for every user node in the network: Symbol Timing, Frequency, Power, Modulation, and FEC. Symbol timing guarantees that each node transmits in exactly the right symbol time within the TDMA frame. Frequency adjustments ensure that bursts stay centered in the allocated spectrum. Power, Modulation, and FEC adjustments are used to maintain an acceptable bit error rate even when the channel is experiencing a severe rain fade.

At least two network features contribute to the responsiveness of the UC process. First, channel quality assessments are made every time a TDMA burst is received at the hub. The assessment consists of a Symbol Offset, Frequency Offset, and an SNR. These are attached to a trailer before the burst payload is forwarded to the central control server. By collecting information in real time, an accurate running average of all parameters for each node is maintained and used to make adjustments. A second feature is the synchronous BTP that notifies the demodulator on the hub receiver as to which user node generated the burst in each time slot. Since the hub receiver knows which modulation and FEC the nodes are using, it can reconfigure these settings in the demodulator on a slot-by-slot basis.

Without synchronized BTP, switching modulation and FEC would still be possible, however, it would not be as efficient because latency would be added and, potentially, data would be lost in the transfer. This latency would be introduced because the node would be notified of the change ¼ second or more after the hub receiver would be notified. Therefore, the hub receiver would be trying to receive with the new modulation and/or FEC although bursts would still be in transit having been sent by the old modulation and/or FEC so they could not be correctly demodulated and decoded. Another problem that would occur without synchronous BTP is that modulation and FEC would have to either be statically mapped to specific slots in the frame or scheduled via messaging that would be subject to the latency problem described above. Such a static mapping would complicate any demand assignment algorithm since it would have an additional constraint that, for example, slot 0 on upstream 1 is using BPSK so that slot may only be assigned to nodes transmitting BPSK. No such restrictions exist when the synchronous BTP is employed.

As mentioned above, the ability to change modulation and FEC dynamically enables all available power to be used to increase throughput rather than wasting power to over come rain fades which happen infrequently.

Figure 18:
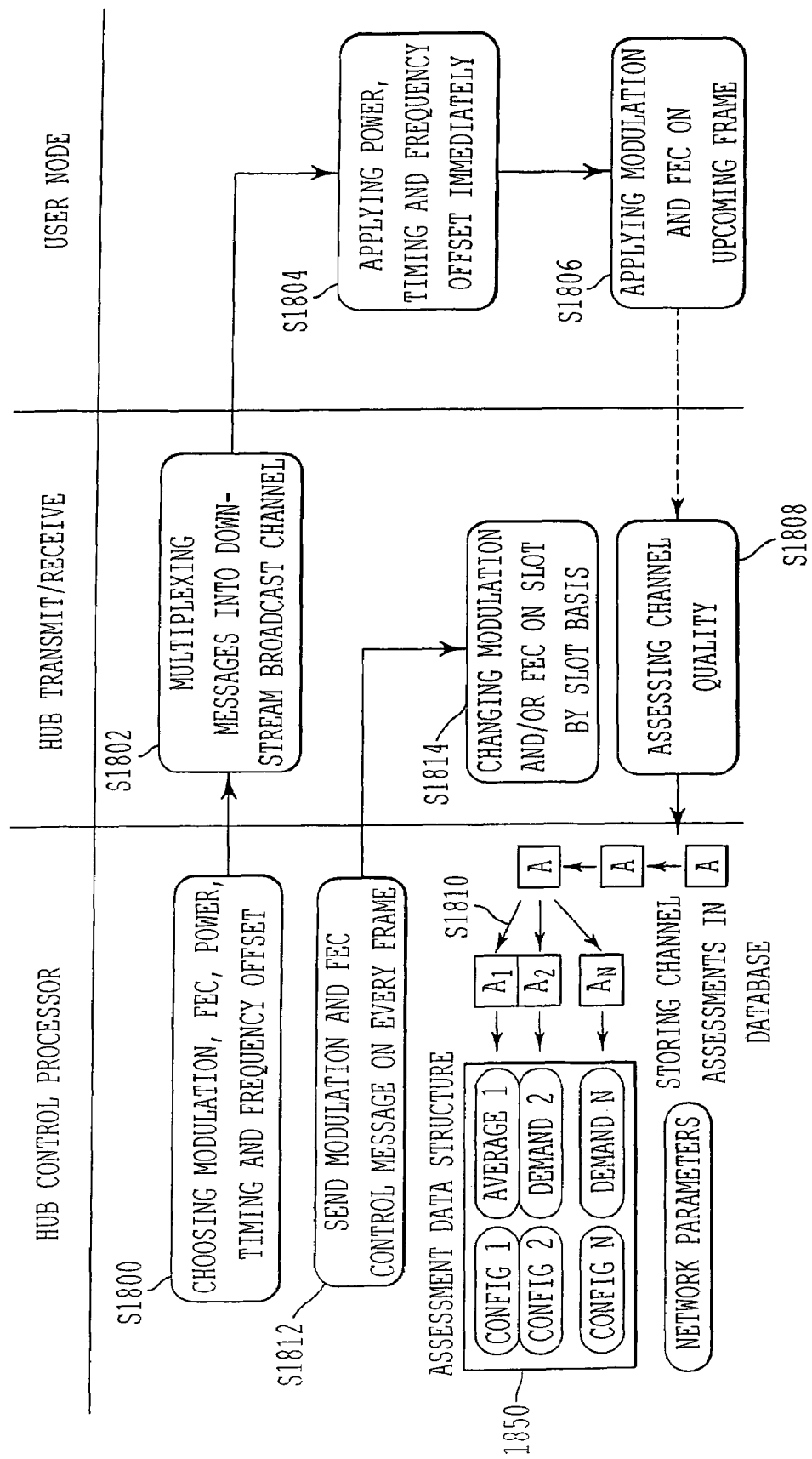
FIG. 18 is an upstream control process flow diagram in a communication network control method according to the present invention.

FIG. 18 illustrates an exemplary embodiment of the Upstream Control Process. For each node, an appropriate modulation and FEC are chosen and adjustments to power, timing, and frequency offset are calculated and placed into a UCP message, by the Central Control Server, in step S1800. UCP Messages are multiplexed into a downstream broadcast channel in the hub transmitter in step S1802. The UCP Message is decoded by each user node, and new power, timing, and frequency offset parameters are immediately applied to a user node transmitter in step S1804, while new modulation and FEC parameters are applied on an upcoming frame in S1806. TDMA bursts are received in the hub receiver, where channel quality is assessed and the assessment is appended to the burst before forwarding to the Central Control Server in step S1808. In the Central Control Server, channel assessments are sorted by user node in step S1810, averaged with other bursts from the same user node, and stored in corresponding positions in an Assessment Data Structure 1850. A message is sent to the hub firmware every frame in step S1812 to prepare for modulation and FEC changes. Synchronous BTP enables the hub receiver to accommodate changes in modulation or FEC on a slot by slot basis in step S1814.

Downstream Recovery Process

Satellite network system link budget constraints are often tighter on the downstream channel, thus, the downstream connection may be the first to drop out during a rain fade. Since there are a number of different types of RF equipment and a number of possible upstream/downstream data rate combinations, a universal network system should have the ability to adapt both directions to combat rain fade.

An obstacle when considering an adaptive technique on the downstream channel is that the downstream channel is a point-to-multipoint connection as opposed to the multipoint-to-point connectivity in the upstream direction. Therefore, any special treatment of the signal to enable one node to receive it more clearly should not affect the ability of any of the other nodes to receive the same carrier.

One way to solve this problem might be to enable the nodes to receive either a BPSK or QPSK signal. The hub could transmit a broadcast QPSK signal while clear sky conditions are present at all nodes and then it could switch to BPSK (and potentially a stronger FEC code) if any node reports a falling SNR. A problem with this solution is that by switching to BPSK, the data rate of the downstream channel is reduced; thus the whole network suffers because there is rain at a single user node site. As the network size grows, the likelihood that at least one node is in a fade condition increases and the network will end up using the lower rate downstream a majority of the time. This negates any advantage of an adaptable downstream.

Figure 19A:
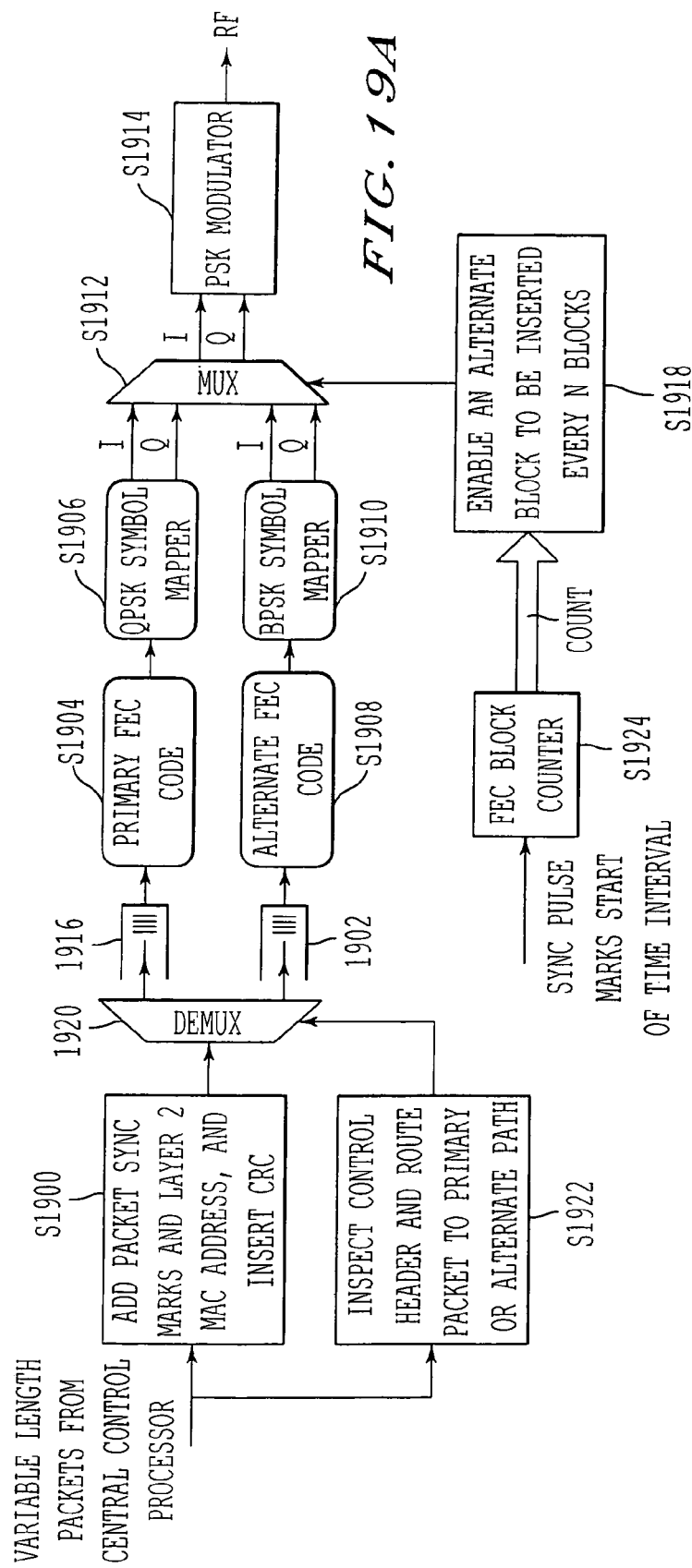
FIG. 19A is a downstream recovery process flow diagram in a communication network control method according to the present invention.

FIGS. 19 (19A-19C) and 20 illustrate an exemplary embodiment of the Downstream Recovery process used to send "recovery" data to only the node which is suffering from a rain fade without changing the manner in which data is sent to the rest of the nodes in the network. In this example, all nodes in clear sky conditions will receive data along the primary path and all fading nodes will receive data that traverses the alternate path. Downstream data packets, intended for user nodes for which downstream recovery has been activated, are marked in the Central Control Server before forwarding, in step S1900. In the hub transmitter step S1950, marked packets are sent either to a primary or alternate modulation path by demux 1920 under control of selection step S1922. Marked packets are sent to a separate layer 2 queue 1902, passed through an alternate FEC encoder in step S1908, and mapped for an alternate modulation in step S1910. Likewise, downstream data packets, intended for user nodes for which downstream recovery has not been activated, are not marked in the Central Control Server before forwarding, in step S1900. In the hub transmitter, unmarked packets are sent to a separate layer 2 queue 1916, passed through a primary FEC encoder in step S1904, and mapped for a primary modulation in step S1906. These packets are then multiplexed in step S1912, and modulated in step S1914 at Layer 1 into the downstream broadcast channel, under the control of FEC block counter 1924 and alternate block enable step S1918. A user node detects locally that its downstream signal is degraded or lost and automatically switches to the alternate FEC and modulation in step S2052. Each user node sends a remote status message containing the average downstream Signal to Noise Ratio (SNR) at a configurable frame, in step S2054. Bursts received at the hub receiver are forwarded to the Central Control Server in step S2056. If reported downstream SNR is greater than a threshold value in step S2060, no action is taken. If SNR falls below the threshold in step S2060, the downstream recovery process is activated for that user node. In addition, if no bursts are received from a user node within a configurable time period, it is declared to be Out of Network and the downstream recovery process is activated for that user node in step S2058.

Both the primary and alternate FEC codes map to the same number of PSK symbols. For example, the primary path may have 4096 bit FEC blocks which map to 2048 QPSK symbols and the alternate path may have 2048 bit FEC blocks which map to 2048 BPSK symbols. This enables either block to be advantageously multiplexed interchangeably at Layer 1 just prior to the PSK modulator. An additional method employed is to orient the BPSK constellation on a 45 degree axis such that the signal energy is divided equally between the Inphase and Quadrature modulation phases. By doing this, the amplitude envelope of the signal does not change whether QPSK or BPSK is used so the signal "looks" the same to all gain stages in the system. This orientation also ensures that valid symbol timing estimates may be made by the demodulators at each node regardless of the modulation because signal peaks and zero crossings will be seen on both phases. Further, since the BPSK constellation is a subset of the QPSK constellation, phase estimates (measurements of the degree of constellation rotation) are valid for either one. The only difference is that the slicer of the BPSK demodulator has a 180 degree decision boundary instead of 90 degrees which results in a 3 dB improvement in the ratio of Energy per bit transmitted to the average noise of the channel (Eb/No). To further improve the ability of nodes to overcome a fade condition, the implementer selects a more powerful, lower rate FEC code for the alternate path than the code used in the primary path.

Figure 19B:
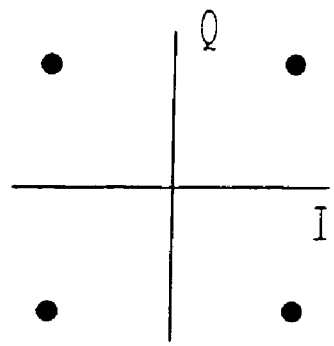
FIG. 19B is a QPSK constellation used in the present invention.
Figure 19C:
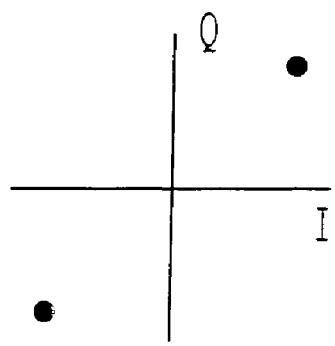
FIG. 19C is a BPSK constellation used in the present invention.
Figure 20:
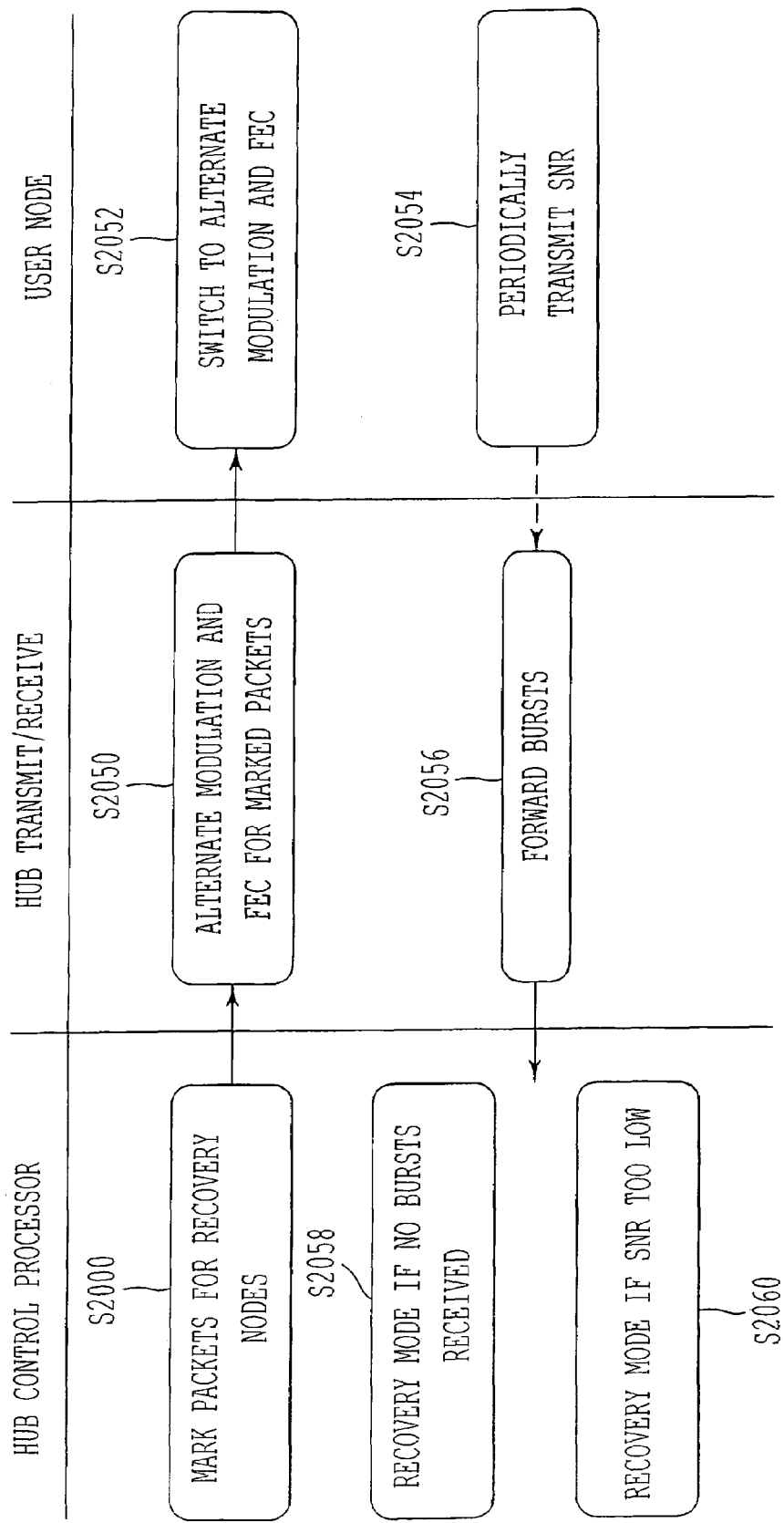
FIG. 20 is a flow diagram of a downstream recovery process in a communication network control method according to the present invention.

An example of an embodiment of the claimed invention is illustrated in FIGS. 19B and 19C. In this example, by offsetting the BPSK constellation by 45 degrees, the signal is distributed equally on the I and Q components and the points are common to the QPSK constellation. Therefore, the demodulators on user nodes in QPSK mode still make valid symbol timing, magnitude, and carrier phase measurements while a BPSK block is being received.

Another advantage of the DR process is that the downstream packet-processing software need not be aware of which path (primary or alternate) the data is traversing. Each data packet is tagged with a Layer 2 MAC address so that each user node filters out packets intended for other nodes. The hub transmitter maintains a list of the MAC addresses of all nodes in DR mode and when a packet arrives for one of those nodes, it is routed to the alternate path. Nodes are added and deleted from this list by the central control server as they enter and exit fade conditions, a feature which is enabled because the size of the FEC block payload (a Layer 1 property) and the data packet size (a property of Layer 2 and higher) are decoupled. This is difficult or impossible in systems without this decoupling, like the DVB satellite broadcast standard, because variable sized data packets are segmented (and later reassembled) into segments that fit into the FEC payload. In such systems, DR would be much more cumbersome because the higher layers would have to account for which nodes were in DR mode and which were not.

In addition, although DR has been discussed so far only in terms of a primary and alternate modulation and encoding, respectively, the present invention also applies to alternative embodiments having multiple levels of alternative modulation and encoding. For example, the robustness of the link may be adjusted by using combinations of modulation and coding schemes, where the robustness of a link generally increases with a greater amount of energy-per-bit as compared to system noise, and more redundancy in the code employed, as discussed in Sklar, B. "Digital Communications Fundamentals and Applications," Prentice Hall, 1988, the entire contents of which being incorporated herein by reference.

FIG. 21 illustrates a computer system 2101 upon which an embodiment of a user node, or hub, of present invention may be implemented. The computer system 2101 includes a bus 2102 or other communication mechanism for communicating information, and a processor 2103 coupled with the bus 2102 for processing the information. The computer system 2101 also includes a main memory 2104, such as a random access memory (RAM) or other dynamic storage device (e.g., dynamic RAM (DRAM), static RAM (SRAM), and synchronous DRAM (SDRAM)), coupled to the bus 2102 for storing information and instructions to be executed by processor 2103. In addition, the main memory 2104 may be used for storing temporary variables or other intermediate information during the execution of instructions by the processor 2103. The computer system 2101 further includes a read only memory (ROM) 2105 or other static storage device (e.g., programmable ROM (PROM), erasable PROM (EPROM), and electrically erasable PROM (EEPROM)) coupled to the bus 2102 for storing static information and instructions for the processor 2103.

The computer system 2101 also includes a disk controller 2106 coupled to the bus 2102 to control one or more storage devices for storing information and instructions, such as a magnetic hard disk 2107, and a removable media drive 2108 (e.g., floppy disk drive, read-only compact disc drive, read/write compact disc drive, compact disc jukebox, tape drive, and removable magneto-optical drive). The storage devices may be added to the computer system 2101 using an appropriate device interface (e.g., small computer system interface (SCSI), integrated device electronics (IDE), enhanced-IDE (E-IDE), direct memory access (DMA), or ultra-DMA).

Figure 22:
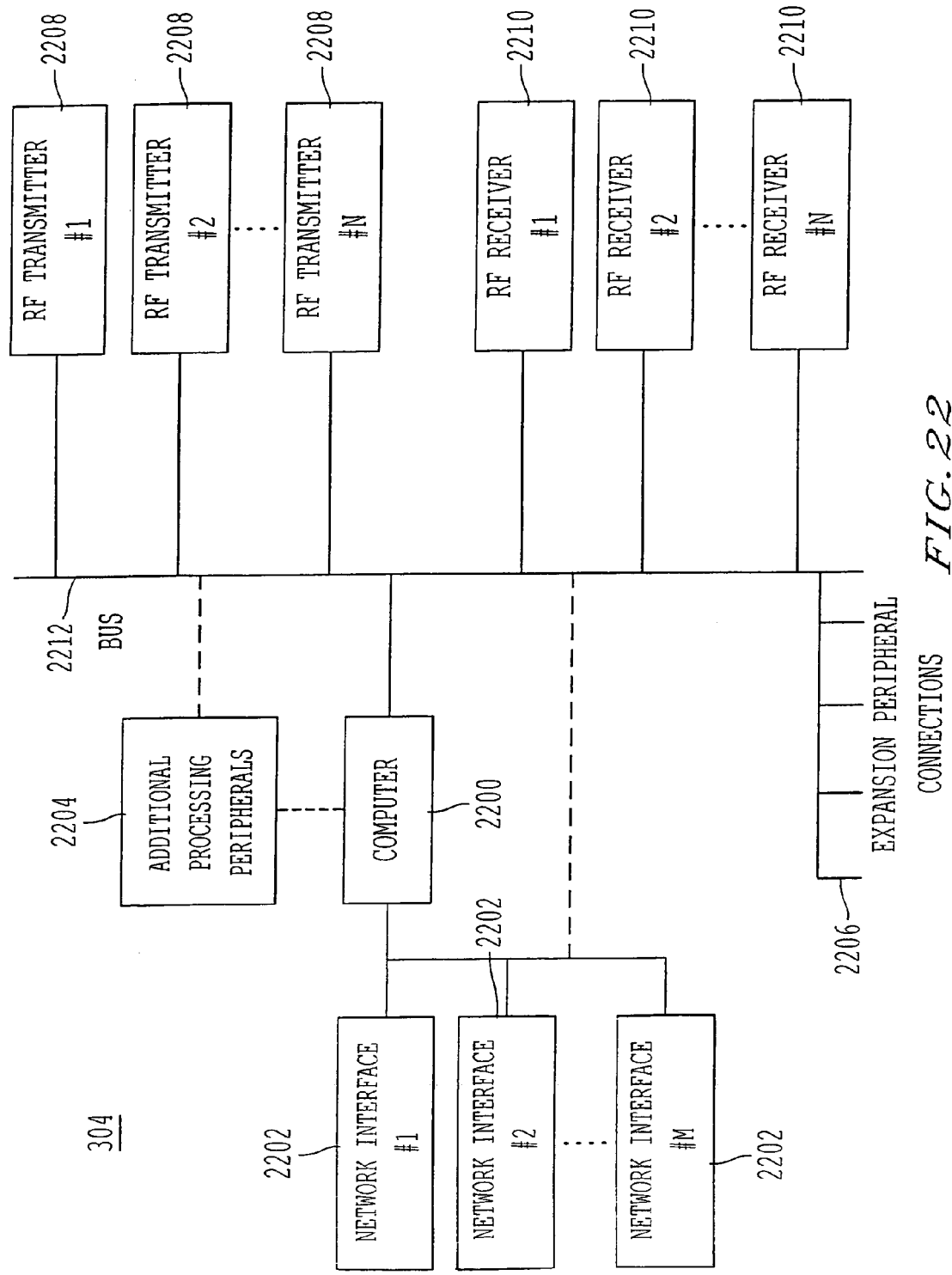
FIG. 22 is a block diagram of an exemplary user node according to the present invention.

FIG. 22 illustrates an example of an embodiment of a user node 304 according to the present invention. In this example, the user node 304 includes a computer 2200 connected to a plurality of network interfaces 2202. The computer 2200 is a general purpose microprocessor based device including volatile and non-volatile storage and standard interfaces. The network interfaces 2202 provide access to 10/100 Ethernet, RS-232, V.35, analog telephony, optical networks, gigabit Ethernet, USB, IEEE 1394, wireless LAN, and other networks. The computer 2200 is also connected to optional additional processing peripherals 2204 to provide additional processing resources such as encryption/decryption engines, data or voice compression devices, content addressable memory devices, video codecs and other functions that may be implemented in programmable logic or custom logic devices configured for custom processing purposes. In addition, the computer 2200 is connected through a bus 2212 to a plurality of RF transmitters 2208, RF receivers 2210, and expansion peripheral connections 2206. The RF transmitters and receivers provide a communication link to the satellite 300, and from there to the hub 302 and to other user nodes 304. The expansion peripheral connections 2206 provide optional connectivity to other devices compatible with the bus 2212 such as storage devices, wireless LAN devices, sound or video cards, lottery systems, point of sale devices, public kiosks, information signs, public internet terminals, bus protocol converters, and other peripherals. Alternatively, the network interfaces may connect directly to the bus 2212 instead of connecting to the computer 2200.

Numerous modifications and variations of the present invention are possible in light of the above teachings. It is therefore to be understood that within the scope of the appended claims, the invention may be practiced otherwise than as specifically described herein.

The invention claimed is:

1. A demand assignment method for a synchronous communication network including a hub and a plurality of user nodes each at a different distance from the hub that communicate with the hub via a satellite, said method comprising steps of:

transmitting a first frame from the hub to said each user node, the first frame including a first burst time plan according to a demand data structure and predetermined rules;

transmitting a first respective data burst in a first frame time period from said each of the user nodes to the hub according to the first burst time plan, a start of the first frame time period from said each of the user nodes being received at the hub simultaneously, each first data burst including a demand field;

storing each demand field in the demand data structure;

transmitting a second frame from the hub to said each user node immediately following the first frame, the second frame including a second burst time plan according to the demand data structure and the predetermined rules;

transmitting a second respective data burst in a second frame time period from said each of the user nodes to the hub according to the second burst time plan, a start of the second frame time period from said each of the user nodes being received at the hub simultaneously, wherein the second respective data burst in the second frame time period is received at the hub immediately following the first respective data burst in the first frame time period.

2. The method of claim 1, wherein the predetermined rules include at least one of configuration parameters, rate shaping rules, and prioritization rules.

3. The method of claim 2, wherein the configuration parameters include at least one of a number of slots per frame, a number of upstream channels per user, and a frame rate.

4. The method of claim 2, wherein the rate shaping rules include at least one of a minimum data rate, a real time data rate, and a committed information rate.

5. The method of claim 2, wherein the prioritization rules include at least one predetermined sequence of servicing minimum data rate demand, servicing real time data rate demand, and servicing committed information rate demand.

6. A system that provides demand assignment to a plurality of nodes in a synchronous communication network, said plurality of user nodes each at a different distance from a hub and communicates with the hub via a satellite, said system comprising:

the hub which is configured to form and transmit a first frame from the hub to said each user node, the first frame including a first burst time plan according to a demand data structure and predetermined rules;

the plurality of user nodes each configured to form and transmit a first data burst in a first frame time period to the hub according to the first burst time plan, a start of the first frame time period from said each of the user nodes being received at the hub simultaneously, each first data burst including a demand field, wherein said hub is configured to store each demand field in the demand data structure and transmit a second frame to said each user node immediately following the first frame, the second frame including a second burst time plan according to the demand data structure and the predetermined rules, each of said plurality of user nodes being configured to form and transmit a second respective data burst in a second frame time period to the hub according to the second burst time plan, a start of the second frame time period from said each of the user nodes being received at the hub simultaneously, the second respective data burst in the second frame time period is received at the hub immediately following the first respective data burst in the first frame time period.

7. The system of claim 6, wherein the predetermined rules include at least one of configuration parameters, rate shaping rules, and prioritization rules.

8. The system of claim 7, wherein the configuration parameters include at least one of a number of slots per frame, a number of upstream channels per user, and a frame rate.

9. The system of claim 7, wherein the rate shaping rules include at least one of a minimum data rate, a real time data rate, and a committed information rate.

10. The system of claim 7, wherein the prioritization rules include at least one predetermined sequence of servicing minimum data rate demand, servicing real time data rate demand, and servicing committed information rate demand.

11. A hub that coordinates demand assignment for a plurality of nodes in a synchronous communication network, said plurality of user nodes each at a different distance from a hub and communicates with the hub via a satellite, said hub comprising:

means for forming and transmitting a first frame to said each user node, the first frame including a first burst time plan according to a demand data structure and predetermined rules;

means for receiving from the plurality of user nodes a first data burst in a first frame time period transmitted to the hub according to the first burst time plan, a start of the first frame time period from said each of the user nodes being received at the hub simultaneously, each first data burst including a demand field;

means for storing each demand field in the demand data structure and transmitting a second frame to said each user node immediately following the first frame, the second frame including a second burst time plan according to the demand data structure and the predetermined rules; and means for receiving from said each of said plurality of user nodes a second respective data burst in a second frame time period according to the second burst time plan, a start of the second frame time period from said each of the user nodes being received at the hub simultaneously, wherein the second respective data burst in the second frame time period is received at the hub immediately following the first respective data burst in the first frame time period.

12. A user node in a synchronous communication network, which is part of a plurality of nodes, said plurality of user nodes each at a different distance from a hub and communicates with the hub via a satellite, said user node comprising:

means for receiving from the hub a first frame, the first frame including a first burst time plan according to a demand data structure and predetermined rules;

means for forming and transmitting a first data burst in a first frame time period to the hub according to the first burst time plan, a start of the first frame time period from said each of the user nodes being received at the hub simultaneously, each first data burst including a demand field, wherein said hub is configured to store each demand field in the demand data structure and transmit a second frame to said each user node immediately following the first frame, the second frame including a second burst time plan according to the demand data structure and the predetermined rules, said user hub further comprising means for forming and transmitting a second respective data burst in a second frame time period to the hub according to the second burst time plan, a start of the second frame time period from said each of the user nodes being received at the hub simultaneously, the second respective data burst in the second frame time period is received at the hub immediately following the first respective data burst in the first frame time period.

* * * * *